United States Patent
Fu et al.

(10) Patent No.: US 10,597,495 B2
(45) Date of Patent: Mar. 24, 2020

(54) AGED POLYMERIC SILSESQUIOXANES

(71) Applicant: Dow Silicones Corporation, Midland, MI (US)

(72) Inventors: Peng-Fei Fu, Midland, MI (US); Byung K. Hwang, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 47 days.

(21) Appl. No.: 16/075,209

(22) PCT Filed: Jan. 11, 2017

(86) PCT No.: PCT/US2017/012905
§ 371 (c)(1),
(2) Date: Aug. 3, 2018

(87) PCT Pub. No.: WO2017/142648
PCT Pub. Date: Aug. 24, 2017

(65) Prior Publication Data
US 2018/0371172 A1 Dec. 27, 2018

Related U.S. Application Data

(60) Provisional application No. 62/297,162, filed on Feb. 19, 2016.

(51) Int. Cl.
| | | |
|---|---|---|
| C08G 77/06 | (2006.01) | |
| C09D 183/04 | (2006.01) | |
| C08G 77/04 | (2006.01) | |
| C09D 7/61 | (2018.01) | |
| C09D 5/00 | (2006.01) | |
| C08K 3/04 | (2006.01) | |
| C08K 3/16 | (2006.01) | |

(52) U.S. Cl.
CPC ............ *C08G 77/06* (2013.01); *C08G 77/04* (2013.01); *C09D 5/006* (2013.01); *C09D 7/61* (2018.01); *C09D 183/04* (2013.01); *C08K 3/04* (2013.01); *C08K 3/16* (2013.01)

(58) Field of Classification Search
None
See application file for complete search history.

(56) References Cited

U.S. PATENT DOCUMENTS

| | | | |
|---|---|---|---|
| 3,455,732 A | 7/1969 | Hathaway et al. | |
| 3,615,272 A | 10/1971 | Collins et al. | |
| 4,756,977 A | 7/1988 | Haluska et al. | |
| 4,999,397 A | 3/1991 | Weiss et al. | |
| 5,010,159 A | 4/1991 | Bank et al. | |
| 5,063,267 A | 11/1991 | Hanneman et al. | |
| 5,516,596 A | 5/1996 | Camilletti et al. | |
| 5,762,697 A | 6/1998 | Sakamoto et al. | |
| 6,150,232 A | 11/2000 | Chan et al. | |
| 6,281,285 B1 | 8/2001 | Becker et al. | |
| 6,410,149 B1* | 6/2002 | Hendricks | B82Y 10/00 257/E21.273 |
| 6,472,076 B1* | 10/2002 | Hacker | C07F 7/21 427/255.36 |
| 6,649,503 B2 | 11/2003 | Kim et al. | |
| 6,930,034 B2 | 8/2005 | Colburn et al. | |
| 7,232,770 B2 | 6/2007 | Moore et al. | |
| 7,756,384 B2 | 7/2010 | Fu et al. | |
| 7,989,030 B2* | 8/2011 | Boisvert | C08G 77/56 427/387 |
| 8,277,939 B2* | 10/2012 | Buether | B32B 17/10036 428/337 |
| 8,653,217 B2 | 2/2014 | Fu et al. | |
| 8,658,050 B2 | 2/2014 | Engelmann et al. | |
| 8,951,716 B2 | 2/2015 | Liu et al. | |
| 2002/0115285 A1* | 8/2002 | Wong | H01L 21/02118 438/638 |
| 2003/0096090 A1* | 5/2003 | Boisvert | C08G 77/12 428/209 |
| 2009/0312568 A1 | 12/2009 | Keller et al. | |
| 2010/0055897 A1* | 3/2010 | Chou | C11D 3/3947 438/638 |
| 2014/0162035 A1 | 6/2014 | Yamamoto et al. | |

FOREIGN PATENT DOCUMENTS

| | | |
|---|---|---|
| EP | 0215069 | 10/1991 |
| EP | 0790645 | 8/1997 |
| JP | 05291030 | 9/2013 |
| JP | 2013-257471 | 12/2013 |

OTHER PUBLICATIONS

Science Magazine, Eckel, et al., Additive Manufacturing of Polymer-derived Ceramics, Jan. 1, 2016, vol. 351, Issue 6268.
JP05-291030 abstract, 2013.
JP2013-257471 abstract, 2013.

* cited by examiner

*Primary Examiner* — Robert S Loewe

(57) ABSTRACT

An aged polymeric silsesquioxane comprising a product of heating a cured polymeric silsesquioxane of formula (I) (see specification) at a temperature of from 460° to 700° C., a formulation comprising the aged polymeric silsesquioxane and at least one additional constituent, methods of making and using the aged polymeric silsesquioxane, and manufactured articles and devices containing the aged polymeric silsesquioxane.

15 Claims, No Drawings

AGED POLYMERIC SILSESQUIOXANES

CROSS REFERENCE TO RELATED APPLICATIONS

This application is a U.S. national stage filing under 35 U.S.C. § 371 of PCT Application No. PCT/US17/012905 filed on 11 Jan. 2017, which claims the benefit of U.S. Provisional Patent Application No. 62/297,162 filed 19 Feb. 2016 under 35 U.S.C. § 119 (e). PCT Application No. PCT/US17/012905 and U.S. Provisional Patent Application No. 62/297,162 are hereby incorporated by reference.

TECHNICAL FIELD

This invention generally relates to aged polymeric silsesquioxanes; formulations, manufactured articles and devices comprising same; methods of making same; and methods of using same. The aged polymeric silsesquioxanes can be used at very high temperatures (e.g., 460 degrees Celsius (° C.) to 700° C.) and yet remain mass stable and, using our new stripper formulation, completely and readily strippable.

BACKGROUND OF THE RELATED ART

Removable polymers have found use in processing and manufacturing of electronic devices and microelectromechanical systems (MEMS) in diverse industries such as aerospace, automotive, and electronics industries. Removable polymers include certain types of inorganic polymers, organic polymers, and silicones. Depending on their properties and intended uses, removable polymers generally fall into one or more of the following categories: sacrificial polymers and reworkable polymers. Electronic devices and MEMS may be made with processes that use one or both of sacrificial and reworkable polymers.

A sacrificial polymer is a substance, such as temporary bonding adhesive and photoresist polymer, that is designed and intended for temporary use in manufacturing of electronic devices and MEMS, and by design is later at least partially removed from the devices after the substance has served its intended purpose. That is, at least some amount of the sacrificial polymer is not allowed to remain in the finished electronic device or MEMS. For example, an integrated circuit (IC) for a semiconductor device may be processed or made with alternating layers or rows of structural materials and sacrificial polymers. After a circuit is formed, the rows of sacrificial polymers are later removed and do not remain in the finished semiconductor device. Or a semiconductor wafer for a semiconductor device may be temporarily adhered to a support wafer with a sacrificial temporary bonding adhesive. The temporary bonding adhesive is later removed from the semiconductor wafer and does not remain in the finished semiconductor device.

A reworkable polymer, such as an encapsulant, interfacial layer, or pottant, is a substance that may be allowed to remain in the finished electronic device or MEMS unless a manufacturing defect is discovered therein. In the latter case, the reworkable polymer may be completely stripped from the device or MEMS in order to enable the reusing of valuable device components such as semiconductor substrates. For example, light-emitting diode (LED)-containing lamps may be made with reworkable polymer encapsulant, and if a defect in one of the lamps is discovered the encapsulant is removed from the defective lamp, and the liberated LED is re-encapsulated with new encapsulant.

Electronic device and MEMS manufacturing and operating requirements impose strict performance requirements on removable polymers. The removable polymers must be stable at temperatures up to 400° C., and yet remain readily and completely strippable using a liquid stripper that does not harm sensitive electrical or optical components. Few removable polymers and liquid strippers have found acceptance in these industries.

If incumbent removable polymers would be exposed to heat that is too high (e.g., >400° C.) during manufacturing or operating processes, it would be expected that they would suffer from one or more drawbacks. They would overly shrink, chemically degrade, lose too much mass (e.g., >15% mass loss), gain too much mass (e.g., >2% mass gain), and/or become unstrippable. The shrinkage can undesirably lead to the removable polymers pulling away from the electrical/optical component(s) with which they were in contact. The chemical degradation of incumbent removable polymers releases corrosive by-products, leading to contamination of sensitive electronic components and MEMS's. Alternatively or additionally, the chemical degradation causes removable polymers to lose properties for which they are employed such as a temporary bonding adhesive prematurely losing adhesiveness or an encapsulant losing optical transmittance properties (spectral changes or decrease in percent transmittance). The mass loss is similar to shrinkage and can undesirably result in associated changes in properties of removable polymers such as increasing hardness, decreasing flexibility, or decreasing thermal conductivity/insulation. The effects of mass gain are similar to the contamination or property loss effects of chemical degradation. Overheating the removable polymers can undesirably lead to their inertness towards liquid strippers, making processing and manufacturing operations inefficient or inoperable.

The nature of the compositions of today's incumbent removable polymers, however, limit their useful manufacturing and operating conditions to a maximum temperature of about 400° C., and typically not more than 300° to 350° C. Above this temperature, it would be expected that incumbent removable polymers would suffer from one or more of the aforementioned drawbacks. For example, a common problem that prevents using incumbent removable polymers at a temperature above 400° C. is that they lose more than 15% mass and/or become unstrippable in liquid strippers. Above 400° C., other incumbent removable polymers undergo chemical degradation and/or gain mass.

The operating limitations of incumbent organic polymers are illustrated by polyimide, which is said to have a maximum service temperature of about 400° C. Polyimide becomes unstable at temperatures above 400° C., where it degrades and gain or lose mass. It may also become unstrippable.

The operating limitations of incumbent inorganic polymers are illustrated by the cured trialkoxaysilane hydrolysates of U.S. Pat. No. 5,762,697 to Yoshinori Sakamoto et al. (SAKAMOTO). SAKAMOTO's polymeric inorganic silsesquioxanes lack or are free of organic groups (e.g., hydrocarbyl groups). The cured trialkoxysilane hydrolysates, which are made by hydrolyzing a trialkoxysilane of formula $(HSi(O(C_1-C_4)alkyl)_3)$, are said to exhibit a very unique thermogravimetric behavior when the thermogravimetric analysis is undertaken in air. Namely, the thermogravimetric curve taken by increasing the temperature [in air] indicates an increase [of weight] of several % (e.g., 3%) at a temperature above 300° C. in great contrast to a conventional coating solution containing a trialkoxy silane hydrolysate which indicates a weight decrease in the thermogravimetric analysis. Films of the cured trialkoxysilane hydrolysates were baked in air at 400° C. for 30 minutes (Application Examples 1 to 3), and then subjected to a test of gas evolution by thermal decomposition using a gas evolution tester and increasing the temperature from 50° to 600° C. Degradation evidenced by gas evolution was observed. Additionally, one of the trialkoxysilane hydrolysate prepolymers and a comparative trialkoxysilane hydrolysate prepolymer were subjected to the thermogravimetric analysis (TG) and differential thermal analysis (DTA) in the temperature range of 40° to 800° C. at a temperature elevation rate of 10° C./minute (Application Example 4) to give solid material 1 and 2, respectively. The solid material 1 indicated a weight increase of about 4.0% at 360° C. or higher up to 800° C., while the solid material 2 indicated a weight decrease of 9.3% when heated up to 800° C. SAKAMOTO's polymeric inorganic silsesquioxanes are vulnerable to excessive weight gain or excessive weight loss at high temperatures and may be unstrippable.

Silicones, with their silicon-bonded organic groups (e.g., hydrocarbyl groups), would be expected to be less mass stable at temperatures above 450° C. than the inorganic polymers of SAKAMOTO. This is because the silicon-bonded organic groups of silicones contain carbon-hydrogen, carbon-carbon, and carbon-silicon bonds, whereas the inorganic polymers of SAKAMOTO do not. These carbon-hydrogen, carbon-carbon, and carbon-silicon bonds provide extra ways for the silicones to undergo chemical decomposition at high temperatures. Examples of such chemical decomposition are reactions that result in oxidation (mass gain), gas evolution, depolymerization, random chain scission, side-group elimination, or a combination of any two or more thereof. These chemical degradations would render the silicones unsuitable for their intended use.

The operating limitations of incumbent silicones are illustrated by incumbent polymeric silsesquioxanes. For example, heating the polymeric silsesquioxane resins mentioned in U.S. Pat. No. 5,010,159 to Howard M. Bank et al. (BANK) and in U.S. Pat. No. 5,063,267 to Larry F. Hanneman (HANNEMAN) above 350° C. may give a polymer that is not strippable. BANK's and HANNEMAN's polymeric silsesquioxane resins also tend to lose too much mass when heated above 400° C. Further, curing BANK's and HANNEMAN's silsesquioxane resins (prepolymers) from silane monomers undesirably requires heating at high temperatures (e.g., 300° or 350° C.). The high temperatures increases process limitations and costs for applications manufacturers of these silsesquioxane resins on devices.

Further illustration of the operating limitations of incumbent polymeric silsesquioxanes is found in the antireflective coatings mentioned in U.S. Pat. No. 7,756,384 B2 to Peng-Fei Fu, et al. ("FU #1"; that Peng-Fei Fu is also a present inventor). FU #1 generally mentions curing silsesquioxane resins (prepolymers) at a temperature of from 80° to 450° C. for 0.1 to 60 minutes to give polymeric silsesquioxanes. In actual practice, certain of FU #1's examples mention baking the silsesquioxane resins (prepolymers) at a maximum temperature of 350° C., but the resulting polymeric silsesquioxanes could not be stripped with a commercial wet stripping solution ACT(R) NE-89 or CC1. Baking the silsesquioxane resins above 350° C. would only worsen the problem.

Further illustration of the operating limitations of incumbent polymeric silsesquioxanes is found in the antireflective coatings mentioned in U.S. Pat. No. 8,653,217 B2 to Peng-Fei Fu, et al. (FU #2; again, that Peng-Fei Fu is also a present inventor). FU #2 generally mentions curing silsesquioxane resins (prepolymers) at a temperature from 80° to 450° C. for 0.1 to 60 minutes to give polymeric silsesquioxanes. In actual practice, certain of FU #2's examples mention baking the silsesquioxane resins (prepolymers) at a maximum temperature of 250° C. The resulting polymeric silsesquioxanes could be completely stripped with ACT(R) NE-89 or CC1. Based on FU #1, however, baking the silsesquioxane resins of FU #2 above 350° C. would be expected to give polymeric silsesquioxanes that could not be stripped with ACT(R) NE-89 (Etch Residue Remover, Air Products and Chemicals, Inc.) or CC1 (Contact Clean 1, ATMI).

BRIEF SUMMARY OF THE INVENTION

This invention generally relates to aged polymeric silsesquioxanes; formulations, manufactured articles and devices comprising same; methods of making same; and methods of using same. The aged polymeric silsesquioxanes are made by heating a cured polymeric silsesquioxanes at from 460° to 700° C. The cured polymeric silsesquioxanes comprise T(H) constituent units of formula $(HSiO_{(3-h)/2}(OH)_h)_x$ and T(aryl) constituent units of formula, wherein $(R^{Ar}SiO_{(3-h)/2}(OH)_h)_y$, wherein H is hydrogen, OH is silicon-bonded hydroxyl, and h, x, $R^{Ar}$, and y are as defined later. The aged polymeric silsesquioxanes can be used in articles, devices and methods at very high temperatures (e.g., 460° to 700° C.) and yet remain mass stable and, using our new stripper formulation, completely and readily strippable.

DETAILED DESCRIPTION OF THE INVENTION

The Brief Summary and Abstract are incorporated here by reference.

We present a solution to the problem of providing a prepolymer that can be cured at moderate temperatures (e.g., 150° to 200° C.) to give a cured polymer, wherein the cured polymer can then be thermally aged and used at high temperatures (460° to 700° C.) in processing and manufacturing of electronic devices and MEMS. More particularly, we have discovered a sub-genus of silicone prepolymers that cure to make cured silicones which, after aging at a temperature of from 460° to 700° C., give an aged silicone that is mass stable and completely and readily strippable in our liquid fluoride stripper. Still more particularly, we have discovered a sub-genus of silsesquioxane resin prepolymers that cure to make cured polymeric silsesquioxanes which, after aging at a temperature of from 460° to 700° C., give an aged polymeric silsesquioxane that is mass stable and completely and readily strippable in our liquid fluoride stripper. Even more particularly, we have discovered a sub-genus of silsesquioxane resin prepolymers that contain certain amounts of T(H) and T(aryl) constituent units and cure to make cured polymeric silsesquioxanes which, after aging at a temperature of from 460° to 700° C., give aged polymeric silsesquioxanes that contain T(H) and T(aryl) constituent units and are completely and readily strippable in our liquid fluoride stripper. The silsesquioxane resin prepolymer, cured polymeric silsesquioxane, and aged polymeric silsesquioxane optionally may be free of or further contain a certain amount of T(Alkyl) constituent units. Yet still more preferably, the silsesquioxane resin prepolymer and cured polymeric silsesquioxane are of formula (I) described later, and the aged polymeric silsesquioxane is a product of heating the cured polymeric silsesquioxane of formula (I) at a temperature of from 460° to 700° C.

We are not aware of any silicone resin that has found use in electronics or MEMS manufacturing or operations at temperatures above 450° C. We believe that the present inventive solution and embodiments we are about to describe are not disclosed, taught or suggested in the art available at the time the present application was filed. We cite art in the BACKGROUND that does not recognize our problem and can only be identified using hindsight knowledge of our invention. In the absence of the teachings and description in this specification, the art cited in the BACKGROUND would not have been deemed to be a starting point for a solution to our problem. It was only after our research and testing that we were able to conceive the present inventive solution and embodiments. Some embodiments of the invention include the following numbered aspects.

Aspect 1. An aged polymeric silsesquioxane that is a product made by a process comprising heating step (a) or (b), wherein heating step (a) is comprised of substeps (a)(1) and (a)(2): (a)(1) heating a silsesquioxane resin prepolymer at a temperature of from 150 degrees Celsius (° C.) to 300° C. for a time of at least 10 seconds to give a cured polymeric silsesquioxane, and then (a)(2) heating the cured polymeric silsesquioxane at a temperature of from 460° to 700° C. for at least 1 minute to give the aged polymeric silsesquioxane, wherein the silsesquioxane resin prepolymer is of formula (I): $(HSiO_{(3-h)/2}(OH)_h)_x(R^{Ar}SiO_{(3-h)/2}(OH)_h)_y(R^{Alk}SiO_{(3-h)/2}(OH)_h)_z$ (I), wherein each $R^{Ar}$ independently is phenyl or naphthyl, each $R^{Alk}$ independently is ($C_1$-$C_3$)alkyl, subscript x is a mole fraction from 0.20 to 0.94, subscript y is a mole fraction from 0.06 to 0.80, subscript z is a mole fraction from 0 to 0.70, the sum x+y+z=1, and each h independently is 0, 1 or 2, wherein in the silsesquioxane resin prepolymer of formula (I) the mole percent, $w^1$, of units having SiOH groups is from 6 to 38 mole percent; or (b) heating a cured polymeric silsesquioxane at a temperature of from 460° to 700° C. for at least 1 minute to give the aged polymeric silsesquioxane; Wherein in the heating step (a) or (b) the cured polymeric silsesquioxane independently is of formula (I): $(HSiO_{(3-h)/2}(OH)_h)_x(R^{Ar}SiO_{(3-h)/2}(OH)_h)_y(R^{Alk}SiO_{(3-h)/2}(OH)_h)_z$ (I), wherein each $R^{Ar}$ independently is phenyl or naphthyl, each $R^{Alk}$ independently is ($C_1$-$C_3$)alkyl, subscript x is a mole fraction from 0.20 to 0.94, subscript y is a mole fraction from 0.06 to 0.80, subscript z is a mole fraction from 0 to 0.70, the sum x+y+z=1, and each h independently is 0, 1 or 2, wherein in the cured polymeric silsesquioxane of formula (I) the mole percent, $w^2$, of units having SiOH groups is from 1 to 20 mole percent; and wherein $w^1 > w^2$; and wherein the silsesquioxane resin prepolymer of formula (I) is characterized by a first mass, mass1, and the aged polymeric silsesquioxane is characterized by a second mass, mass2, wherein mass2=from 0.85 mass1 to 1.02 mass1.

The loss or gain of mass of the aged polymeric silsesquioxane is relative to the starting weight of the silsesquioxane resin prepolymer of formula (I) (i.e., a dried form, solvent-free form, thereof). The weight of the dried form of the silsesquioxane resin prepolymer of formula (I) is equal to the weight of the cured polymeric silsesquioxane of formula (I) prepared therefrom by curing. In some embodiments the loss or gain of mass of the aged polymeric silsesquioxane is relative to the starting weight of the cured polymeric silsesquioxane of formula (I). The aged polymeric silsesquioxane may lose from >0% to less than 15% mass, alternatively from >0% to less than 10% mass, alternatively from >0% to <7% mass, all relative to the silsesquioxane resin prepolymer of formula (I). In some embodiments the aged polymeric silsesquioxane may lose from >0% to <6% mass, alternatively from >0% to <5% mass, alternatively from >0% to <4% mass, alternatively from >0% to <3% mass, alternatively from >0% to 2% mass, all relative to the silsesquioxane resin prepolymer of formula (I). In some embodiments the aged polymeric silsesquioxane may lose at least 1.9% mass, alternatively at least 2.0% mass, all relative to the silsesquioxane resin prepolymer of formula (I). Alternatively, the aged polymeric silsesquioxane may gain from >0% to <2% mass, alternatively from >0% to <1% mass, alternatively from >0% to <0.5% mass, all relative to the silsesquioxane resin prepolymer of formula (I). Alternatively, the aged polymeric silsesquioxane may not gain or loss mass, relative to the silsesquioxane resin prepolymer of formula (I). The aged polymeric silsesquioxane may be characterized by mass loss conducted by subjecting the silsesquioxane resin prepolymer of formula (I) to thermogravimetric analysis (TGA) according to the Stability Test Method 1, alternatively the Stability Test Method 2, each as described later.

The aged polymeric silsesquioxane may be characterized by shrinkage of a film thereof. The shrinkage of a film of the aged polymeric silsesquioxane may be calculated as being equal to thickness of the film of the aged polymeric silsesquioxane divided by a starting thickness of a film of the cured polymeric silsesquioxane of formula (I) from which the aged polymeric silsesquioxane film was prepared by thermal aging, expressed as a percentage. The film of the cured polymeric silsesquioxane of formula (I) may be prepared by applying a mixture of 10 wt % silsesquioxane resin prepolymer of formula (I) in PGMEA (after the mixture had been filtered through a 0.2 micrometer PTFE filter) onto a 15 centimeter diameter silicon wafer, spin-coating the applied material to give a film, and soft baking the resulting film at 150° C. for 60 seconds to give a film of silsesquioxane resin prepolymer of formula (I); and heating the film of the silsesquioxane resin prepolymer of formula (I) at 200° C. for 10 minutes to cure the silsesquioxane resin prepolymer of formula (I) and give the film of the cured polymeric silsesquioxane of formula (I). The starting thickness of the film of the cured polymeric silsesquioxane of formula (I) prepared in this way may be from 0.2 to 5 micrometers. In some embodiments, the shrinkage of the film of the aged polymeric silsesquioxane relative to the starting thickness of the film of the cured polymeric silsesquioxane of formula (I) after thermal aging under dry molecular nitrogen gas atmosphere at 500° C. for 30 minutes is from 0.2% to 6.5%. Alternatively, the shrinkage of the film of the aged polymeric silsesquioxane relative to the starting thickness of the film of the cured polymeric silsesquioxane of formula (I) after thermal aging at 600° C. for 30 minutes is from 9% to 17%.

The silsesquioxane resin prepolymer of formula (I) may have a silanol content of from 6 to 38 mole percent (mol %), alternatively from 6 to 35 mol %, alternatively from 6 to 30 mol %, alternatively from 6 to 25 mol %, alternatively from 10 to 38 mol %, alternatively from 15 to 38 mol %, alternatively from 15 to 35 mol %, alternatively from 10 to 30 mol %, alternatively from 20 to 35 mol %, alternatively from 25 to 38 mol %, alternatively 7 mol %±1 mol %, alternatively 8 mol %±2 mol %, alternatively 9 mol %±3 mol %, alternatively 10 mol %±3 mol %, alternatively 11 mol %±3 mol %, alternatively 12 mol %±3 mol %, alternatively 13 mol %±3 mol %, alternatively 14 mol %±3 mol %, alternatively 15 mol %±3 mol %, alternatively 16 mol %±3 mol %, alternatively 17 mol %±3 mol %, alternatively 18 mol %±3 mol %, alternatively 19 mol %±3 mol %, alternatively 20 mol %±3 mol %, alternatively 21 mol %±3 mol %, alternatively 22 mol %±3 mol %, alternatively 23 mol %±3 mol %, alternatively 24 mol %±3 mol %, alternatively 25 mol %±3 mol %, alternatively 26 mol %±3 mol %, alternatively 27 mol %±3 mol %, alternatively 28 mol %±3 mol %, alternatively 29 mol %±3 mol %, alternatively 30 mol %±3 mol %, alternatively 31 mol %±3 mol %, alternatively 32 mol %±3 mol %, alternatively 33 mol %±3 mol %, alternatively 34 mol %±3 mol %, alternatively 35 mol %±3 mol %, alternatively 36 mol %±2 mol %, alternatively 37 mol %±1 mol %. The cured polymeric silsesquioxane of formula (I) may have a silanol content of from 1 to 20 mol %, alternatively from 2 to 20 mol %, alternatively from 3 to 20 mol %, alternatively from 4 to 20 mol %, alternatively from 5 to 20 mol %, alternatively from 2 to 19 mol %, alternatively from 5 to 19 mol %, alternatively from 5 to 16 mol %, alternatively from 5 to 15 mol %, alternatively from 7 to 15 mol %, alternatively 5 mol %±1 mol %, alternatively 6 mol %±1 mol %, alternatively 7 mol %±1 mol %, alternatively 8 mol %±1 mol %, alternatively 9 mol %±1 mol %, alternatively 10 mol %±1 mol %, alternatively 11 mol %±1 mol %, alternatively 12 mol %±1 mol %, alternatively 13 mol %±1 mol %, alternatively 14 mol %±1 mol %, alternatively 15 mol %±1 mol %. Alternatively, or additionally, to the silanol content or the silanol content and the thermal aging characterization, the silsesquioxane resin prepolymer of formula (I) may have a weight average molecular weight ($M_W$) of 25,000; alternatively from ≥25,000 to 2,000,000; alternatively from 30,000 to 2,000,000; alternatively from 50,000 to 2,000,000; alternatively from 75,000 to 2,000,000; alternatively from 100,000 to 1,000,000; alternatively from 500,000 to 2,000,000.

Aspect 2. The aged polymeric silsesquioxane of aspect 1 wherein the process comprises the heating step (a).

Aspect 3. The aged polymeric silsesquioxane of aspect 1 wherein the process comprises the heating step (b).

Aspect 4. The aged polymeric silsesquioxane of any one of aspects 1-3 characterizable by any one of the following limitations (A) to (R): (A) wherein in the heating substep (a)(2) or in the heating step (b) the cured polymeric silsesquioxane of formula (I) is heated at a temperature from 460° C. to 600° C. for a time from 1 minute to 120 minutes; (B) wherein in the heating substep (a)(2) or in the heating step (b) the cured polymeric silsesquioxane of formula (I) is heated at a temperature from 500° C. to 700° C. and for a time from 1 minute to 120 minutes; (C) wherein the aged polymeric silsesquioxane is characterized as being at a temperature of from 460° to 700° C.; (D) wherein the aged polymeric silsesquioxane is characterized as being at a temperature of from −40° to 40° C.; (E) wherein the silsesquioxane resin prepolymer of formula (I) has a weight average molecular weight, $M_W$, from 30,000 to 3,000,000; (F) limitation (E) and any one of limitations (C) and (D); (G) wherein mass2=from 0.86 mass1 to 1.00 mass1, wherein mass2=from 0.91 mass1 to <1.00 mass1, or wherein mass2=from 0.93 mass1 to 0.99 mass1; (H) wherein after an embodiment of the heating substep (a2) or heating step (b) consisting of heating at 500° C. for 60 minutes, the mass2=from 0.91 mass1 to 1.00 mass1; (I) wherein after an embodiment of the heating substep (a2) or heating step (b) consisting of heating at 600° C. for 60 minutes, the mass2=from 0.91 mass1 to 1.00 mass1; (J) wherein after an embodiment of the heating substep (a2) or heating step (b) consisting of heating at 500° C. for 60 minutes, the mass2=from 0.93 mass1 to 1.00 mass1; (K) wherein after an embodiment of the heating substep (a2) or heating step (b) consisting of heating at 600° C. for 60 minutes, the mass2=from 0.93 mass1 to 1.00 mass1; (L) both limitations (H) and (I); (M) both limitations (J) and (K); (N) wherein the cured polymeric silsesquioxane of formula (I) and the aged polymeric silsesquioxane differ from each other by at least one chemical characteristic selected from: solubility by immersion in 2.4 (e.g., 2.37 to 2.38) weight percent aqueous tetramethylammonium hydroxide ($TMAH_{aq}$) at 60° C. for 10 minutes, wherein the solubility of the aged polymeric silsesquioxane is at least 25% less than the solubility of the cured polymeric silsesquioxane of formula (I) therein; or speed of dissolution in 2.4 weight percent aqueous tetramethylammonium hydroxide ($TMAH_{aq}$) at 60° C. (that is, the aged polymeric silsesquioxane is characterized as being TMAH-resistant); (O) wherein the cured polymeric silsesquioxane of formula (I) and the aged polymeric silsesquioxane differ from each other by at least one structural characteristic selected from content of silicon-bonded hydrogen atoms, that is "Si—H content" (or "SIH content"), as measured by Fourier-Transform Infrared (FT-IR) Spectroscopy, wherein the Si—H content of the aged polymeric silsesquioxane is at least 25% less than the Si—H content of the cured polymeric silsesquioxane of formula (I); (P) at least two of limitations (N) and (O); (Q) limitation (N) or (O) and any one of limitations (A) to (M); and (R) wherein the silsesquioxane resin prepolymer of formula (I) and the cured polymeric silsesquioxane of formula (I) differ from each other by at least one chemical characteristic selected from: solubility in propylene glycol monomethyl ether monoacetate, PGMEA, at 25° C., wherein the silsesquioxane resin prepolymer of formula (I) is completely soluble and the cured polymeric silsesquioxane of formula (I) is insoluble or at least partially insoluble, all measured with 0.10 g of the silsesquioxane resin prepolymer of formula (I) or cured polymeric silsesquioxane of formula (I), respectively, in 1.0 milliliter of PGMEA at 25° C. In some embodiments the selected physical characteristic is (A), alternatively (B), alternatively (C), alternatively (D), alternatively (E), alternatively (F), alternatively (G), alternatively (H), alternatively (I), alternatively (J), alternatively (K), alternatively (L), alternatively (M), alternatively (N), alternatively (O), alternatively (P), alternatively (Q), alternatively (R).

Alternatively, the cured polymeric silsesquioxane of formula (I) and the aged polymeric silsesquioxane may differ from each other by at least one physical characteristic selected from: (S) nanoindentation measured on a 2 micrometer thick test film; (T) a change in heights of SiH peaks as measured by FT-IR spectroscopy using the respective heights of the Si—H peak; and (U) a change in SiH/SiO molar ratios as measured by FT-IR spectroscopy using the respective heights of the Si—H peak compared to the respective heights of the Si—O peak. In some embodiments the selected physical characteristic is (S), alternatively (T), alternatively (U). In FT-IR of the silsesquioxane resin prepolymer of formula (I), the typical Si—H peak is about 2244 reciprocal centimeters ($cm^{-1}$) and the typical Si—O peak is about 1045 $cm^{-1}$. In FT-IR of the aged polymeric silsesquioxane the typical Si—H peak is from 2244 to 2248 $cm^{-1}$ and the typical Si—O peak is from 1008 to 1022 $cm^{-1}$. Generally, the greater the extent of thermal aging (e.g., all other things being equal, the higher the thermal aging temperature), the higher the $cm^{-1}$ value for the Si—H peak and the lower the $cm^{-1}$ value for the Si—O peak. In some embodiments the Si—H/Si—O ratio of the silsesquioxane resin prepolymer of formula (I) (after soft baking a film thereof at 150° C. for 60 seconds) is from 0.7 to 1.6, whereas the Si—H/Si—O ratio of the aged polymeric silsesquioxane prepared therefrom by curing, and then thermal aging under a dry molecular nitrogen gas atmosphere at 500° C. for 30 minutes is from 0.4 to <0.7 and/or the Si—H/Si—O ratio of the aged polymeric silsesquioxane prepared therefrom by curing, and then thermal aging under a dry molecular nitrogen gas atmosphere at 600° C. for 30 minutes is from 0.2 to <0.3.

For $TMAH_{aq}$ resistance, the greater the amount of undissolved aged polymeric silsesquioxane after the immersion step, the greater the extent of the $TMAH_{aq}$ resistance thereof. Conversely, the more aged polymeric silsesquioxane that dissolves in the $TMAH_{aq}$, the lesser the extent of $TMAH_{aq}$ resistance thereof. For purposes of testing $TMAH_{aq}$ resistance, the aged polymeric silsesquioxane may be in the form of a film. The film may have a thickness of from 0.4 micrometer (μm) to 1.0 μm, alternatively 0.5 μm. The $TMAH_{aq}$ resistance may be measured according to the Stripping Test Method 1 described later wherein the stripping solution is the 2.4 weight percent $TMAH_{aq}$.

Aspect 5. The aged polymeric silsesquioxane of any one of aspects 1-4 made by a process comprising the heating substep (a) wherein after performing the heating substep (a)(1) the process further comprises a substep (a)(1.5) cooling the cured polymeric silsesquioxane of formula (I) to a temperature of from 0° C. to 40° C. prior to performing the heating substep (a)(2).

For convenience and brevity, the silsesquioxane resin prepolymer of formula (I), the cured polymeric silsesquioxane of formula (I), and the aged polymeric silsesquioxane may be collectively referred to as "inventive silsesquioxane materials". In some embodiments the inventive silsesquioxane materials consist essentially of, alternatively consist of, formula (I): $(HSiO_{(3-h)/2}(OH)_h)_x(R^{Ar}SiO_{(3-h)/2}(OH)_h)_y(R^{Alk}SiO_{(3-h)/2}(OH)_h)_z$ (I-a), wherein each $R^{Ar}$ independently is phenyl or naphthyl, each $R^{Alk}$ independently is $(C_1$-$C_3)$alkyl, subscript x is a mole fraction from 0.20 to 0.94, subscript y is a mole fraction from 0.06 to 0.80, subscript z is a mole fraction from 0 to 0.70, the sum x+y+z=1, and each h independently is 0, 1 or 2, wherein respective SiOH contents are as defined in aspect 1. As used in this context, the phrase "consisting essentially of" means a middle ground between an open-ended term like comprising and a closed-ended term like consisting of, where that middle ground does not affect the basic and novel characteristics of the claimed invention. In some aspects the phrase consisting essentially of means that either (i) the only monovalent organic groups in the inventive silsesquioxane materials are the $R^{Ar}$ and $R^{Alk}$ groups; (ii) the only constituent units in the inventive silsesquioxane materials are the $HSiO_{(3-h)/2}(OH)_h$, $R^{Ar}SiO_{(3-h)/2}(OH)_h$, and, optionally, $R^{Alk}SiO_{(3-h)/2}(OH)_h$ constituent units and/or optionally $[SiO_{4/2}]_q$ constituent units wherein when present q is a mole fraction from >0 to <0.05; or (iii) both (i) and (ii). When limitation (i) is met, the inventive silsesquioxane materials lack or are free of any other monovalent organic groups (e.g., are free of monovalent alkenyl, organoheteryl, and heterohydrocarbyl groups). Limitation (i) may be determined using nuclear magnetic resonance (NMR) spectroscopy such as $^1$H-NMR or $^{13}$C-NMR. When limitation (ii) is met, the inventive silsesquioxane materials lack or are free of any other constituent units (e.g., D units of formula $R^D_2SiO_{2/2}$, wherein each $R^D$ is independently hydrocarbyl; and M units of formula $R^M_3SiO_{1/2}$, wherein each $R^M$ is independently hydrocarbyl). Limitation (ii) may be determined using NMR spectroscopy such as $^{29}$Si-NMR. As used in this context, the closed-ended phrase "consists of" means that the inventive silsesquioxane materials have only the constituent units and groups shown in formula (I). In some embodiments the only constituent units in the inventive silsesquioxane materials are the $HSiO_{(3-h)/2}(OH)_h$, $R^{Ar}SiO_{(3-h)/2}(OH)_h$, and $[SiO_{4/2}]_q$ constituent units, wherein h and $R^{Ar}$ are as defined for formula (I) and q is a mole fraction from >0 to <0.05. In some embodiments the only constituent units in the inventive silsesquioxane materials are the $HSiO_{(3-h)/2}(OH)_h$ and $R^{Ar}SiO_{(3-h)/2}(OH)_h$ constituent units, wherein h and $R^{Ar}$ are as defined for formula (I). In some embodiments the only constituent units in the inventive silsesquioxane materials are the $HSiO_{(3-h)/2}(OH)_h$, $R^{Ar}SiO_{(3-h)/2}(OH)_h$, $R^{Alk}SiO_{(3-h)/2}(OH)_h$ and $[SiO_{4/2}]_q$ constituent units, wherein h, $R^{Ar}$ and $R^{Alk}$ are as defined for formula (I) and q is a mole fraction from >0 to <0.05. In some embodiments the only constituent units in the inventive silsesquioxane materials are the $HSiO_{(3-h)/2}(OH)_h$, $R^{Ar}SiO_{(3-h)/2}(OH)_h$, and $R^{Alk}SiO_{(3-h)/2}(OH)_h$ constituent units, wherein h, $R^{Ar}$ and $R^{Alk}$ are as defined for formula (I).

In some embodiments of the inventive silsesquioxane materials, each h is 0 (i.e., each constituent unit in formula (I) is a T unit); alternatively one h is 1 and the other h is/are 0. Alternatively or additionally, each $R^{Ar}$ is phenyl; alternatively or additionally, each $R^{Alk}$, when present, is methyl. Alternatively or additionally, x is from 0.20 to 0.50, or from 0.50 to 0.94; y is from 0.20 to 0.80, or from 0.40 to 0.80; and z is from 0 to 0.10, and the sum x+y+z=1.

In some embodiments the aged polymeric silsesquioxane is the aged polymeric silsesquioxane of any one of the working examples described later. In other embodiments the aged polymeric silsesquioxane is not (excludes) the aged polymeric silsesquioxane of any one of the working examples described later.

Aspect 6. An article of manufacture comprising the aged polymeric silsesquioxane of any one of aspects 1-5. The article of manufacture may be configured as a sheet; a plurality of particulates; or a designed pattern. The designed pattern may be a geometric pattern.

Aspect 7. The article of manufacture of aspect 6 further comprising a substrate, which is disposed in operative contact with the aged polymeric silsesquioxane.

Aspect 8. An electronic device comprising the aged polymeric silsesquioxane of any one of aspects 1-5 and an electronic component disposed in operative contact therewith.

Aspect 9. A method of making a high-temperature-formed feature of a semiconductor device, the method comprising subjecting an article comprising the aged polymeric silsesquioxane of any one of aspects 1-5 disposed on a semiconductor component to at least one fabricating step carried out at a temperature of from 460° to 700° C. to give a semiconductor device comprising a high-temperature-formed feature and the aged polymeric silsesquioxane disposed on the semiconductor component.

Aspect 10. The method of aspect 9 further comprising any one of the following limitations (1) to (7): (1) wherein the high temperature-formed feature is made by a material deposition or treatment process carried out at a temperature of from 460° to 700° C.; (2) wherein the high temperature-formed feature is made by a material deposition or treatment process carried out at a temperature of from 460° to 700° C., wherein the material deposition process comprises chemical vapor deposition using a CVD precursor or atomic layer deposition using an ALD precursor; and wherein the treatment process comprises annealing, ashing, or etching; all carried out at a temperature of from 460° to 700° C.; (3) wherein the aged polymeric silsesquioxane is pre-made via step (a) or (b) before the fabricating step is performed or the aged polymeric silsesquioxane is made via step (a) or (b) in situ when the fabricating step is performed; (4) wherein the method further comprises, before the fabricating step is performed, spin-coating a mixture of the silsesquioxane resin prepolymer of formula (I) and a delivery vehicle on the semiconductor component to give a wet coating, and removing the delivery vehicle from the wet coating to give a dried coating of the silsesquioxane resin prepolymer of formula (I) in contact with the semiconductor component; (5) wherein the semiconductor component comprises a semiconductor wafer; and (6) wherein the high temperature-formed feature comprises a deposit of a semiconductor material, an annealed semiconductor material, an ashing residue, or an etched layer; and (7) wherein the semiconductor device comprises a photo(voltaic)cell, a diode, a transistor, or an integrated circuit.

Aspect 11. The method of any one of aspects 9-10 further comprising wet stripping at least some of the aged polymeric silsesquioxane from the semiconductor component with a liquid fluoride stripper, wherein the liquid fluoride stripper comprises acetic acid, dimethyl acetamide, ammonium fluoride, and water, wherein the concentration of the ammonium fluoride is from at least 4 weight percent (wt %) to 15 wt % based on total weight of the liquid fluoride stripper, the wet stripping comprising contacting the aged polymeric silsesquioxane with the liquid fluoride stripper so as to dissolve at least some of the aged polymeric silsesquioxane in the liquid fluoride stripper.

Aspect 12. A formulation comprising a dispersion of particulates of the aged polymeric silsesquioxane of any one of aspects 1-5 and at least one additional constituent that is not the aged polymeric silsesquioxane.

Aspect 13. The formulation of aspect 12 wherein the at least one additional constituent is the cured polymeric silsesquioxane of formula (I); the silsesquioxane resin prepolymer of formula (I); a liquid vehicle; an organosiloxane monomer or oligomer; a silane; a non-resinous polyorganosiloxane; an organic polymer; a particulate carbon; and a particulate inorganic solid.

Aspect 14. A method of removing an aged polymeric silsesquioxane of any one of aspects 1-5 from a substrate in contact therewith, wherein the liquid fluoride stripper comprises acetic acid, dimethyl acetamide, ammonium fluoride, and water, wherein the concentration of the ammonium fluoride is from at least 4 weight percent (wt %) to 15 wt % based on total weight of the liquid fluoride stripper, the method comprising contacting the aged polymeric silsesquioxane with a liquid fluoride stripper so as to dissolve at least some of the aged polymeric silsesquioxane in the liquid fluoride stripper. The aged polymeric silsesquioxane and liquid fluoride stripper are typically at a temperature of 20° to 60° C. during the contacting step.

Aspect 15. The invention of any one of aspects 1-14 comprising any one of the following limitations (aa) to (ll): (aa) the cured polymeric silsesquioxane of formula (I) comprises a product of curing a substantially solvent free form of the silsesquioxane resin prepolymer of formula (I) having less than 0.5 wt % solvent having a boiling point of from 30° to 150° C.; (bb) each $R^{Ar}$ is phenyl and each $R^{Alk}$ is methyl; (cc) both (aa) and (bb); (dd) subscript x is a mole fraction from 0.25 to 0.90, subscript y is a mole fraction from 0.10 to 0.50, subscript z is a mole fraction from 0 to 0.65, and the sum x+y+z=1; (ee) subscript z is 0 and the aged polymeric silsesquioxane is of formula (I-a): $(HSiO_{3/2})_x$ $(PhenylSiO)_{3/2y}$ (I-a), wherein subscript x is from 0.5 to 0.94 and subscript y is from 0.06 to 0.5 and the sum x=y=1; (ff) both (bb) and (ee); (gg) each of (aa), (bb) and (ee); (hh) subscript z is a mole fraction from 0.40 to 0.65 and the aged polymeric silsesquioxane is of formula (I-b): $(HSiO_{3/2})_x$ $(PhenylSiO_{3/2})_y(CH_3SiO_{3/2})_z$ (I-b), wherein subscript x is from 0.25 to 0.40, subscript y is from 0.10 to 0.25, subscript z is the mole fraction from 0.40 to 0.65, and the sum x+y+z=1; (ii) both (bb) and (hh); (jj) each of (aa), (bb) and (hh); (kk) each $R^{Ar}$ is phenyl and each $R^{Alk}$ is methyl; and the mole fractions of the resulting $(HSiO_{3/2})_x$ unit (T(H)), the $(phenylSiO)_{3/2y}$ unit (T(phenyl)), and the $(methylSiO)_{3/2y}$ unit (T(methyl)) in the silsesquioxane resin prepolymer of formula (I), the cured polymeric silsesquioxane of formula (I), or the aged polymeric silsesquioxane are selected from: $T(H)_{0.90}T(phenyl)_{0.10}$; $T(H)_{0.85}T(phenyl)_{0.15}$; $T(H)_{0.80}T(phenyl)^{0.20}$; $T(H)_{0.50}T(phenyl)^{0.50}$; $T(H)_{0.35}T(phenyl)_{0.25}T(methyl)_{0.40}$; $T(H)_{0.30}T(phenyl)_{0.25}T(methyl)_{0.45}$; $T(H)_{0.25}T(phenyl)_{0.10}T(methyl)^{0.65}$; and $T(H)_{0.40}T(phenyl)_{0.10}T(methyl)_{0.50}$; (ll) limitation (kk) and either (aa) or (cc).

This invention is described herein in an illustrative manner by disclosing a plurality of representative, non-limiting embodiments and examples. The terms used herein may be readily understood by a skilled artisan. Some terms are defined by IUPAC such as, for example, in IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook. Terms not defined by IUPAC may be defined in Hawley's CONDENSED CHEMICAL DICTIONARY, 11th edition, N. Irving Sax & Richard J. Lewis, Sr., 1987 (Van Nostrand Reinhold). Other terms are defined below. Any reference to such terms herein shall default to these definitions unless a different meaning of the term, phrase or expression is stated or indicated from the context of different description elsewhere herein. For example, if a concentration is expressed elsewhere herein as a mole percent, then it is not the default weight percent.

Alternatively shall indicate an independent embodiment. Amount and ratio of amounts is based on weight. Articles "a", "an", and "the" each refer to one or more. Aspect and embodiment are used interchangeably.

"By-product" means a secondary product of a chemical reaction.

"Catalyst" means a homogeneous or heterogeneous catalyst, which may be supported or unsupported, and which may or may not be a composite catalyst. "Chemical element" or "atom", a Group or Groups of chemical elements, or a Periodic Table of the Elements shall mean the chemical elements, Group(s), and Periodic Table of the Elements published by IUPAC, version dated 1 May 2013; see iupac.org/reports/periodic_table/). "Coating" is used interchangeably with "film" and means a material that is restricted in one dimension. The restricted dimension may be characterized as "thickness". "Comparative," as in comparative example, is for illustration purposes only and shall not mean something from the prior art. "Composition" means chemical matter that may be defined by an empirical formula of its constituent elements. "Concentration" as a "percent" or "%" means weight percent (wt %) and is based on total weight of all ingredients used to make the material being described, which total weight is 100 wt %. "Contacting" means bringing into physical contact.

"Ene" used as a suffix in a chemical name, such as hydrocarbylene, alkylene, alkenylene, arylene, and phenylene means a divalent radical group. The "ene" names may be used interchangeably with their "diyl" names such as hydrocarbon-diyl, alkane-diyl, alkene-diyl, arene-diyl, benzene-diyl, respectively. "Examples" of the invention may be relied upon and provide adequate support for specific inventive embodiments.

"Free of" is used interchangeably with "lacks" and means not detectable using nuclear magnetic resonance (NMR) spectroscopy (e.g., $^1$H-NMR, $^{13}$C-NMR, or $^{29}$Si-NMR) or Fourier Transform-Infrared (FT-IR) spectroscopy; alternatively a complete absence of.

"Greater than" or ">" encompasses a range or subrange that includes as its upper endpoint the absolute maximum (e.g., 100%) or, as the case may be where there is no absolute maximum, a practical maximum (e.g., 10,000 repeat units or 10,000,000 g/mol. Alternatively, the upper endpoint may be less than the absolute maximum (e.g., <100%) or less than the practical maximum (e.g., <10,000 repeat units or <10,000,000 g/mol).

"Heteroatom" in an organic group that contains same means any atom other than carbon and hydrogen. Typically heteroatoms in organic groups that contain same are selected from N, O, S, and P; alternatively N, O, and S; alternatively N or O. "Heterohydrocarbyl" is a monovalent organic group that, in its unsubstituted form, contains at least one heteroatom and has its formal radical on a carbon atom. "Hydrocarbyl" is a monovalent organic group that, in its unsubstituted form, is composed of carbon and hydrogen atoms only and has its formal radical on a carbon atom.

"Invention" or an equivalent expression (e.g., the present invention, this invention or the invention) shall mean representative inventive embodiments or aspects, and shall not be used to unduly limit inventive scope. "IUPAC" is International Union of Pure and Applied Chemistry (IUPAC Secretariat, Research Triangle Park, N.C., USA).

"Less than" or "<" encompasses a range or subrange that includes as its lower endpoint the absolute minimum (e.g., zero (0)) or, as the case may be where there is no absolute minimum, a practical minimum (e.g., greater than zero (>0). Alternatively, the lower endpoint may be greater than the absolute minimum (e.g., >0%). "Concentration <10 wt %" means from >0 to <10 wt %.

Markush group of members A, B, and C may be equivalently expressed as: "a member selected from A, B, and C"; "a member selected from the group consisting of A, B, and C"; or "a member A, B, or C". The Markush group may comprise a genus and a subgenus thereof, a genus and a specific member thereof, or a subgenus and a specific member thereof; each of which may be relied upon individually or collectively. "May" confers a choice, not an imperative. "Molecular mass" of a molecule means molecular weight (MW) expressed in grams per mole. "Average molecular mass" of a polymer means weight average molecular weight ($M_W$) expressed in grams. $M_W$ is determined using gel permeation chromatography (GPC) with polystyrene standards.

"Operative" means functionally effective. E.g., "operative contact" comprises functionally effective touching, e.g., as for modifying, coating, adhering, sealing, or filling. The operative contact may be direct physical touching, alternatively indirect touching, provided it is effective for its intended purpose. "Optionally" means is absent (or excluded), alternatively is present (or included). "Organic group" and "organo group" are used interchangeably and may be unsubstituted or substituted and composed of one or more carbon atoms and hydrogen atoms (when unsubstituted) and, optionally, heteroatoms. An organic group may be monovalent (having one free valence), divalent (having two free valences), trivalent (having three free valences), or tetravalent (having four free valences); also known as univalent, bivalent, trivalent, or quadravalent, respectively. Each formal radical of an organic group independently may be on a carbon atom or, when present, optionally on a heteroatom. "Organoheteryl" is a monovalent organic group that, in its unsubstituted form, has at least one heteroatom and has its formal radical on a heteroatom. "Organyl" is a monovalent organic group that in its unsubstituted form, optionally may or may not contain at least one heteroatom and has its formal radical on a carbon atom.

Properties of a material (e.g., viscosity) are measured, by default, using a test method for measuring same conducted at 23 degrees Celsius (° C.) and 101.3 kilopascals (kPa). "Purify" means to increase concentration of a desired ingredient (up to 100%).

Ranges relied upon herein describe and contemplate all ranges and subranges including endpoints and whole and/or fractional values therein. A disclosed endpoint or disclosed individual number between endpoints of a range or subrange may be relied upon and provides adequate support for specific inventive embodiments. "Remainder" means a portion that is left behind, e.g., a pot residue after a distillation.

"Separation" means to cause to physically move apart, and thus as a result be no longer in direct touching. "Silanol content" means a concentration of silicon-bonded hydroxyl groups (Si—OH) and is expressed as mole percent (mol %) and is determined by silicon-29 nuclear magnetic resonance ($^{29}$Si-NMR). "Silicone" encompasses linear, branched, and mixtures of linear and branched polyorganosiloxane macromolecules. The branched polyorganosiloxane macromolecules include silsesquioxane resins and resin-linear polyorganosiloxane macromolecules. A silicone may be composed of one or more of M, D, T, and Q units, wherein an M unit is of formula $R^M_3SiO_{1/2}$, a D unit is of formula $R^D_2SiO_{2/2}$, a T unit is of formula $R^TSiO_{3/2}$, and a Q unit is of formula $SiO_{4/2}$; wherein each $R^M$, $R^D$, and $R^T$ independently is hydrogen, halogen, hydroxyl, or an organic group. "SiOZ" encompasses all silicon-bonded hydroxyl and silicon-bonded O-hydrocarbyl groups. E.g., SiOH, SiOmethyl, SiOethyl, SiOpropyl, and SiO(1-methylpropyl) groups. "Substituents" on organic groups may be designated as "SUB", wherein each SUB independently is a halogen atom, —NH$_2$, —NHR, —NR$_2$, —NO$_2$, —OH, —OR, oxo (=O), —C≡N, —C(=O)—R, —OC(=O)R, —C(=O)OH, —C(=O)OR, —SH, —SR, —SSH, —SSR, —SC(=O)R, —SO$_2$R, —OSO$_2$R, —SiR$_3$, and —Si(OR)$_3$; wherein each R independently is an unsubstituted ($C_1$-$C_{30}$)hydrocarbyl. Halogen atom is F, Cl, Br, or I; alternatively F, Cl, or Br; alternatively F or Cl; alternatively F; alternatively Cl. "Substrate" means a thing having at least one surface upon which a material may be hosted.

"Thereof" shall refer to, and may be amended to be replaced by, that immediately preceding element, member, feature, limitation, list, or group to which reference is being made.

"Vehicle" means a liquid acting as a carrier, hosting medium, dispersant, diluent, supernatant, or solvent for another material, which may or may not be soluble therein.

Any compound includes all "Isotopic forms" thereof, including natural abundance isotopes, isotopically-enriched isotopes, and mixtures thereof. In some aspects, the isotopic forms are the natural abundance isotopes, alternatively the isotopically-enriched isotopes. The isotopically-enriched forms of a silicon-containing compound have a greater-than-natural-abundance amount of deuterium, tritium, $^{29}$Si, $^{30}$Si, $^{32}$Si, or a combination of any two or more thereof. Isotopically-enriched forms of the compound may have additional uses wherein detection of the isotopically-enriched compound or an isotopically-enriched material made or synthesized therefrom would be helpful. Examples of such uses are medical research and anti-counterfeiting applications.

In some aspects any composition described herein may contain any one or more of the chemical elements of Groups 1 to 18 of the Periodic Table of the Elements, unless that chemical element has been specifically excluded. Certain elements are not typically excluded, including Si, O, H, C, N, a halogen, a metal of any catalyst described elsewhere herein. Other than the foregoing, typically excluded chemical elements may be: (i) at least one chemical element from any one of Groups 2 to 13 and 18, including the lanthanoids and actinoids; (ii) at least one chemical element from any one of the third to sixth rows of the Periodic Table of the Elements, including the lanthanoids and actinoids; or (iii) both (i) and (ii), except not excluding Si, O, H, C, N, a halogen, a metal of any catalyst described elsewhere herein. In some aspects any composition does not contain a chemical element having any one of the following atomic numbers: 2, 3, 4, 5, 7, 10, 11, 12, 13, 15, 16, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, and 116, except for the metal of any catalyst described elsewhere herein.

As used herein "mass stable" and "mass-stable" generally mean resistant to loss or gain of mass (weight), relative to a starting weight, after being heated at a thermal aging temperature (e.g., from 460° to 700° C.), wherein the loss or gain of weight is due to a chemical mechanism and not due to a physical phenomenon such as evaporation of a volatile non-siloxane residue such as a solvent. The chemical mechanism may comprise oxidation, gas evolution, depolymerization, random chain scission, side-group elimination, or a combination of any two or more thereof. By gain or loss of mass of the aged polymeric silsesquioxane, what is meant is that, compared to a given measured starting weight (e.g., 1.000 grams (g)) of the silsesquioxane resin prepolymer of formula (I), or compared to a given measured starting weight (e.g., 1.000 g) of the cured polymeric silsesquioxane of formula (I) made therefrom by curing the silsesquioxane resin prepolymer of formula (I), weight of the aged polymeric silsesquioxane prepared therefrom (by thermal aging the cured polymeric silsesquioxane of formula (I)) has a higher weight (mass gain) or a lower weight (mass loss) relative to the given starting weight of the silsesquioxane resin prepolymer of formula (I), or to the starting weight of the cured polymeric silsesquioxane of formula (I) made therefrom. For example, compared to a starting weight of 1.000 g of the silsesquioxane resin prepolymer of formula (I), a mass gain of 2% gives an ending weight of 1.0200 g of the aged polymeric silsesquioxane, whereas a mass loss of 15% gives an ending weight of 0.8500 g of the aged polymeric silsesquioxane.

By mass stable, in some embodiments we mean that the aged polymeric silsesquioxane retains at least 85% of the mass, and gains no more than 2% of the mass, of the silsesquioxane resin prepolymer of formula (I) from which it was made via curing and then thermal aging thereof. That is, any mass loss from the aged polymeric silsesquioxane is limited to from >0% to 15% of the starting weight of the silsesquioxane resin prepolymer of formula (I). Also, any mass gain to the aged polymeric silsesquioxane is limited to from >0% to 2% of the starting weight of the silsesquioxane resin prepolymer of formula (I). Said differently, the mass of the aged polymeric silsesquioxane is from 0.85 to 1.02 times the starting mass of the silsesquioxane resin prepolymer of formula (I) from which it was made via curing and then thermal aging thereof. Since the mass of the dried form (e.g., after soft bake at 150° C.) of the silsesquioxane resin prepolymer of formula (I) is equal to the mass of the cured polymeric silsesquioxane of formula (I) prepared therefrom by curing, the aforementioned mass gain and loss limitations also apply to the aged polymeric silsesquioxane with respect to the starting weight of the cured polymeric silsesquioxane of formula (I). Thus, the aged polymeric silsesquioxane may not gain or lose mass (0% gain or loss), alternatively may gain from >0% to 2% mass, alternatively may lose from >0% to less than 15% mass. Alternatively, the aged polymeric silsesquioxane may lose from >0% to less than 10% mass, alternatively from >0% to <7% mass. In some embodiments the aged polymeric silsesquioxane loses from >0% to <6% mass, alternatively from >0% to <5% mass, alternatively from >0% to <4% mass, alternatively from >0% to <3% mass, alternatively from >0% to ≤2% mass. In some embodiments the aged polymeric silsesquioxane loses at least 1.9% mass, alternatively at least 2.0% mass. This low extent of mass loss makes the aged polymeric silsesquioxane suitable for use in high temperature manufacturing methods that are emerging in the aerospace and semiconductor device fabrication industries.

The aged polymeric silsesquioxane remains completely and readily strippable in our liquid fluoride stripper. By completely and readily strippable, we mean that a 1 micrometer thick film of the aged polymeric silsesquioxane disposed on a substrate (e.g., a polysilicon wafer) can be completely removed within 20 minutes from the substrate by immersion of the film in our liquid fluoride stripper. Our stripper comprises acetic acid, dimethyl acetamide, ammonium fluoride, and water, wherein the concentration of the ammonium fluoride is from at least 4 weight percent (wt %) to 15 wt % based on total weight of the liquid fluoride stripper, wherein temperature of the liquid fluoride stripper is 60° C., alternatively 23° C. Therefore, when the aged polymeric silsesquioxane is used as a coating on a substrate, the coating can be completely stripped from the substrate using our liquid fluoride-based stripper. Further, our stripper is compatible with electronic and optical components typically in need of being processed or operated with removable materials. Examples of such components are a photocell or a photovoltaic cell (collectively, a photo(voltaic) cell), a diode, a transistor, and an integrated circuit. Thus, the aged polymeric silsesquioxane is suitable for semiconductor device manufacturing processes that require stripping, as well as manufacturing process for making electronic devices wherein the aged polymeric silsesquioxane can be allowed to remain in the electronic device.

The aged polymeric silsesquioxane may be used in high temperature (460° to 700° C.) processing and operating conditions such as electronic device processing and manufacturing operations. Because the aged polymeric silsesquioxane remains strippable, it may be used as a removable polymer, alternatively as a sacrificial polymer, alternatively as a reworkable polymer. The aged polymeric silsesquioxane will find many uses, including applications in industries such as the aerospace, automotive, and semiconductor device industries. As device feature sizes decrease or performance requirements increase, these industries may move to conducting processing and manufacturing operations at the high temperature range of 460° to 700° C., where the performance of the aged polymeric silsesquioxane is distinguished over that of incumbent removable polymers.

The aged polymeric silsesquioxane may be made as a mass-stable product at thermal aging temperatures higher than 700° C., e.g., from >700° to 1,000° C. Thus, the aged polymeric silsesquioxane may be used in ultrahigh temperature (>700° to 1,000° C.) processing and operating conditions such as electronic device processing and manufacturing operations.

An "aged polymeric silsesquioxane" generally is a product of a thermal aging process that occurs in the cured polymeric silsesquioxane of formula (I) upon heating the cured polymeric silsesquioxane of formula (I) at a high temperature, e.g., from 460° to 700° C., the "thermal aging temperature". The aging may proceed for a period of time, the thermal aging time, of at least 1 minute, and typically from 10 to 120 minutes. In some embodiments the heating is conducted for a thermal aging time until the aged polymeric silsesquioxane reaches mass equilibrium (i.e., constant weight, i.e., ±0.1 wt %) at that thermal aging temperature. The resulting aged polymeric silsesquioxane is characterized as being a "mass-stable product" at that thermal aging temperature and, naturally, at lower thermal aging temperatures and below (e.g., 23° or 100° C.). Determining that the aged polymeric silsesquioxane has become the mass-stable product at a particular thermal aging temperature is a simple matter of periodically weighing the aged polymeric silsesquioxane until two consecutive weights thereof are the same. In other embodiments the aged polymeric silsesquioxane has been thermally aged at a thermal aging temperature for a period of time insufficient to achieve mass equilibrium (i.e., insufficient to achieve constant weight, i.e., ±0.1 wt %) at that thermal aging temperature such that the aged polymeric silsesquioxane is characterized as being an "aged product". Determining that the aged polymeric silsesquioxane is the aged product at a particular thermal aging temperature is a simple matter of measuring two consecutive weights thereof that are not the same. In some embodiments the aged polymeric silsesquioxane is the mass-stable product, alternatively the aged product, all at any one of the thermal aging temperatures described herein.

In some embodiments the aged polymeric silsesquioxane is the mass-stable product of thermally aging the cured polymeric silsesquioxane of formula (I). Typically, a thermal aging time that is sufficient for the aged polymeric silsesquioxane to achieve mass equilibrium, and thus be characterized as the mass-stable product, is from 10 to 120 minutes, alternatively from 10 to 90 minutes, alternatively from 10 to 75 minutes, alternatively from 10 to 60 minutes, alternatively from 10 to 30 minutes, alternatively from 20 to 120 minutes, alternatively from 20 to 90 minutes, alternatively from 20 to 75 minutes, alternatively from 20 to 60 minutes, alternatively from 30 to 120 minutes, alternatively from 30 to 90 minutes, alternatively from 30 to 60 minutes, alternatively from 2 to 15 minutes, alternatively from 5 to 30 minutes, alternatively from 5 to 20 minutes.

As used herein, the term "thermal aging" generally means a process comprising heating a material at 460° to 700° C., the thermal aging temperature, for a period of time, the thermal aging time, of at least 1 minute. If the thermal aging time is sufficient for the material to achieve mass equilibrium (i.e., constant weight, i.e., ±0.1 wt %), the material is said to be mass stable at that thermal aging temperature, and thus is characterized as the mass-stable product. Before that achievement is reached, the material is said to be the aged product. The thermal aging process is distinct from other types of aging processes such as light-induced aging, physical aging of polymers, and crystallization. The thermal aging process results in changes in physical and/or chemical structure and the values of the properties of the aged polymeric silsesquioxane relative to the cured polymeric silsesquioxane of formula (I). The aged polymeric silsesquioxane differs in at least one property, other than mass, from the cured polymeric silsesquioxane of formula (I) such as weight average molecular weight, structure, crosslink density, bulk density, silanol content, SiH content, solubility in stripper, or a combination of any two or more thereof. The present thermal aging may be done in any compatible atmosphere such as air; carbon dioxide; an inert atmosphere such as a gas of molecular nitrogen, argon, or helium; or a mixture thereof. The atmosphere may be stationary or flowing relative to the polymeric silsesquioxanes. The thermal aging may be done in the absence of ultraviolet and/or visible light.

A "cured polymeric silsesquioxane" generally means a polymer that has been made by a curing process of converting a silsesquioxane resin prepolymer (e.g., of formula (I)) into a polymer of higher molar mass and then into a network. For non-invention applications that employ a cured polymeric silsesquioxane (e.g., of formula (I)), the cured polymeric silsesquioxane would be considered to be a final polymer. But in the present invention the cured polymeric silsesquioxane (e.g., of formula (I)) is considered to be an intermediate polymer useful in the making of the aged polymeric silsesquioxane. The curing process may comprise heating the silsesquioxane resin prepolymer (e.g., of formula (I)) at a cure temperature until it has been cured to give the cured polymeric silsesquioxane. The heating may be performed separately from the thermal aging, or may be performed as a preliminary and consecutive portion of a heating profile comprising a lower heating for in situ curing, followed by a higher heating for thermal aging. The curing process that comprises heating, however, is distinct from the thermal aging process in terms of temperatures used, heating times used, materials used, and products produced. For example, the curing temperature of from 150° to 300° C. is quite different from the thermal aging temperature of from 460° to 700° C. described elsewhere herein and the curing time typically is shorter than the thermal aging time. Also, the curing process may employ a curing agent to enhance the rate or extent of curing, whereas the thermal aging process may lack a curing agent. Alternatively, in other embodiments wherein a curing agent may be employed in contact with the silsesquioxane resin prepolymer (e.g., of formula (I)), once the cured polymeric silsesquioxane (e.g., of formula (I)) is made, the curing agent may no longer have an effect and may be a by-stander constituent in the thermal aging process used to make the aged polymeric silsesquioxane. Examples of curing agents that may be employed in these embodiments are condensation catalysts, such as tin salts and titanium alkoxides, useful for enhancing condensation curing of silsesquioxanes. The curing process is also distinct from other types of processes such as light-induced aging, physical aging of polymers, and crystallization.

"Propylene glycol methyl ether acetate", "1,2-propylene glycol monomethyl ether monoacetate", and "PGMEA" means a molecule or collection of molecules of the formula: $CH_3O-CH_2CH(CH_3)-OC(=O)CH_3$. CAS No. 108-65-6.

"Tetramethylammonium hydroxide" or "TMAH" means a molecule or collection of molecules of formula $N(CH_3)_4OH$.

Specifically referring to the above definitions, the silsesquioxane resin prepolymer is the silsesquioxane resin prepolymer of formula (I), the cured polymeric silsesquioxane made therefrom is the cured polymeric silsesquioxane of formula (I), and the aged polymeric silsesquioxane is the aged polymeric silsesquioxane made from the cured polymeric silsesquioxane of formula (I). The cured polymeric silsesquioxane of formula (I) and the aged polymeric silsesquioxane may also be independently characterized as being copolymers. The aged polymeric silsesquioxane may also be defined by formula (I). In describing silsesquioxane resin prepolymer of formula (I), the cured polymeric silsesquioxane of formula (I), and the aged polymeric silsesquioxane made therefrom of formula (I), the formula (I) may be independently used to describe each of the inventive silsesquioxane materials even though the inventive silsesquioxane materials differ from each other in structure because the formulas (I) are condensed formulas ("semi-structural formulas"). A condensed formula is a type of chemical formula that falls somewhere in-between a full structural formula (exact structure) and an empirical formula (a listing of atoms and stoichiometries) in terms of structural detail in that a condensed formula conveys some, but full structural information. It may be convenient to distinguish between the inventive silsesquioxane materials of formula (I) by referring to the silsesquioxane resin prepolymer of formula (I) as being of formula (I-srp), the cured polymeric silsesquioxane of formula (I) as being of formula (I-cps), and the aged polymeric silsesquioxane as being of formula (I-aps).

Each of the inventive silsesquioxane materials independently may be further defined by its isotopic composition. Each such inventive silsesquioxane materials may be a natural abundance isotope form, alternatively an isotopically-enriched form, alternatively a mixture of said forms. The isotopically-enriched forms of the inventive silsesquioxane materials include forms that contain a greater-than-natural-abundance amount of deuterium, tritium, $^{29}Si$, $^{30}Si$, $^{32}Si$, or a combination of any two or more thereof. In addition to the uses of the inventive silsesquioxane materials described herein, isotopically-enriched forms of the inventive silsesquioxane materials may be useful in applications wherein detection of the isotopically-enriched inventive silsesquioxane materials or an isotopically-enriched silicon material (e.g., film) made therefrom would be helpful. Examples of such applications are medical research and anti-counterfeiting applications. The inventive silsesquioxane materials having different isotopic compositions may differ from each other in at least one property, function, and/or use. Further, an isotopically-enriched form of a particular type of inventive silsesquioxane material may differ a natural abundance or other isotopically-enriched form of the same type of inventive silsesquioxane material in at least one property, function, and/or use (e.g., an isotopically-enriched form of the aged polymeric silsesquioxane may differ from a natural abundance form of the aged polymeric silsesquioxane in at least one property, function, and/or use).

In addition to structure, the inventive silsesquioxane materials (the silsesquioxane resin prepolymer of formula (I), the cured polymeric silsesquioxane of formula (I), and the aged polymeric silsesquioxane of formulas (I)) differ from each other in at least one property, function, and/or use. Examples of such different properties are one or more of thermal stability (mass stability during heating), adhesiveness, solubility in an organic solvent (e.g., toluene or methyl ethyl ketone), and strippability in a liquid stripper. Generally the silsesquioxane resin prepolymer of formula (I) is soluble in an organic solvent and any liquid stripper, the cured polymeric silsesquioxane of formula (I) is at least soluble in any liquid stripper, and the aged polymeric silsesquioxane is insoluble in organic solvent, insoluble in most commercial liquid strippers (e.g., ACT® NE-89 or CC1), and soluble in our liquid fluoride stripper. ACT® NE-89 is a fluoride-containing stripper formulated for use in etch residue removal and controlled etching of contaminated oxide surfaces in single wafer processing and is available from Air Products and Chemicals, Inc. (Allentown, Pa., USA). CC1 is Contact Clean 1, available from ATMI, an Entegris company.

The silsesquioxane resin prepolymer of formula (I) may be made, i.e., synthesized, by a controlled hydrolysis of trichlorosilane ($HSiCl_3$), aryltrichlorosilane ($ArSiCl_3$), and optionally alkyltrichlorosilane ($AlkSiCl_3$) in a suitable solvent such as an aprotic solvent such as a hydrocarbon such as heptane or toluene to give a first mixture of the silsesquioxane resin prepolymer of formula (I) in the solvent. The hydrolysis is controlled by modulating temperature, amount and concentration of water, and solvent as described in U.S. Pat. No. 7,756,384 B2 and U.S. Pat. No. 8,653,217 B2. In some embodiments the solvent is PGMEA containing 3.5% water. The synthesized silsesquioxane resin prepolymer of formula (I) will comprise $(HSiO_{3/2})_x(R^{Ar}SiO_{3/2})_y(R^{Alk}SiO_{3/2})_z$, wherein $R^{Ar}$, $R^{Alk}$, and subscripts x, y and z are as defined above. The mole fractions of the units in formula (I) of $(HSiO_{3/2})_x$, $(R^{Ar}SiO_{3/2})_y$, and $(R^{Alk}SiO_{3/2})_z$ will be equal to the relative molar amounts of the $HSiCl_3$, $ArSiCl_3$, and any $AlkSiCl_3$ used in the controlled hydrolysis. The controlled hydrolysis is a single phase reaction that desirably gives a homogeneous silsesquioxane resin prepolymer of formula (I). For example, an embodiment of the silsesquioxane resin prepolymer of formula (I) that is of formula $(HSiO_{3/2})_x(R^{Ar}SiO_{3/2})_y$ may be synthesized according to the synthetic procedure disclosed in U.S. Pat. No. 7,756,384 B2 and an embodiment of the silsesquioxane resin prepolymer of formula (I) that is of formula $(HSiO_{3/2})_x(R^{Ar}SiO_{3/2})_y(R^{Alk}SiO_{3/2})_z$ wherein z is >0 may be synthesized according to a procedure of U.S. Pat. No. 8,653,217 B2.

If desired, the synthesized silsesquioxane resin prepolymer of formula (I) may be isolated in neat form or reformulated with a different solvent. E.g., if desired, evaporate the solvent and volatiles, such as any unreacted trichlorosilanes and volatile by-products, from the aforementioned first mixture to give the silsesquioxane resin prepolymer of formula (I) as a dried or isolated solid.

Alternatively, if desired, replace the solvent used in the aforementioned synthesis of the silsesquioxane resin prepolymer of formula (I) with a solvent suitable for applying the silsesquioxane resin prepolymer of formula (I) as a coating on a substrate, e.g., via solvent exchange. Coating suitable solvents include spin coating suitable solvents such as PGMEA. For example, if the synthesis used toluene, solvent exchange the PGMEA for the toluene of the first mixture to give a second mixture of the silsesquioxane resin prepolymer of formula (I) in PGMEA. The solvent exchange may be done by adding PGMEA to the first mixture to give an intermediate mixture, and evaporating the toluene from the intermediate mixture without evaporating all of the PGMEA from the intermediate mixture to give the second mixture. The second mixture may lack toluene and contain the silsesquioxane resin prepolymer of formula (I) dispersed in PGMEA. A convenient embodiment of the second mixture may contain 10 wt % of the silsesquioxane resin prepolymer of formula (I) in PGMEA. The concentration of the silsesquioxane resin prepolymer of formula (I) in PGMEA may be adjusted as desired by adding additional PGMEA to or evaporating some of the PGMEA from the second mixture. The second mixture may be filtered using a 0.2 μm filtration membrane to give a solution of the silsesquioxane resin prepolymer of formula (I) in PGMEA. The second mixture may be subjected to an evaporating step to give the silsesquioxane resin prepolymer of formula (I) as a dried or isolated solid.

In some embodiments the evaporation step applied to the first or second mixture may be a soft bake step comprising briefly (e.g., from 30 seconds to 5 minutes, e.g., 1 minute) heating the first mixture at a temperature sufficient to evaporate the volatiles such as 120° to 150° C. Soft baking is commonly used in the semiconductor device fabrication art. The soft baking step may give a dried solid film of the silsesquioxane resin prepolymer of formula (I). Alternatively, the evaporating may comprise applying a vacuum to the first or second mixture, or both heating and applying a vacuum thereto.

The cured polymeric silsesquioxane of formula (I) may be prepared by heating an isolated or dried form of the silsesquioxane resin prepolymer of formula (I) at a temperature from 150° to 300° C. ("the cure temperature") as described herein. The heating may be carried out by any convenient means such as on a hot plate set at the cure temperature, in an oven such as a dual furnace set at the cure temperature, or using an infrared lamp or laser sufficiently powerful to attain the cure temperature. In some embodiments the cure temperature may be from 150° to 250° C., alternatively from 170° to 210° C., alternatively from 180° to 200° C.

The aged polymeric silsesquioxane may be prepared by heating an isolated or dried form of the cured polymeric silsesquioxane of formula (I) at the temperature of 460° to 700° C. ("thermal aging temperature"). In some embodiments the thermal aging temperature may be from 460° to 650° C., alternatively from 460° to 640° C., alternatively from 460° to 600° C., alternatively from 460° to 550° C., alternatively from 460° to 500° C., alternatively from 500° to <700° C., alternatively from 500° to 650° C., alternatively from 500° to 600° C., alternatively from 600° to 700° C., alternatively from 550° to 650° C. The heating may be carried out by any convenient means such as on a hot plate set at the thermal aging temperature, in an oven such as a dual quartz furnace set at the thermal aging temperature, or using an infrared lamp or laser sufficiently powerful to attain the thermal aging temperature.

The thermal aging may immediately follow the curing as part of a same thermal profile comprising a curing temperature range and a thermal aging temperature range. The thermal profile may comprise heating the silsesquioxane resin prepolymer of formula (I) from room temperature (e.g., 23° C.) up to the thermal aging temperature at a controlled heating rate (e.g., 10° to 20° C./minute), passing through the curing temperature range and producing the cured polymeric silsesquioxane of formula (I) before reaching the thermal aging temperature range. Alternatively, the curing may be performed, the resulting cured polymeric silsesquioxane of formula (I) may be stored for a period of time (e.g., from 1 minute to 1 year) at a storage temperature (e.g., from −40° to 40° C.), and then the cured polymeric silsesquioxane of formula (I) may be thermally aged to give the aged polymeric silsesquioxane. For example, it may be convenient to prepare a coating of the cured polymeric silsesquioxane of formula (I) on a substrate such as a semiconductor wafer, and store the resulting coated substrate for a period of time before subjecting the cured polymeric silsesquioxane of formula (I) of the coated substrate to the thermal aging process to give a thermally aged coated substrate comprising a coating of the aged polymeric silsesquioxane disposed on the substrate (e.g., semiconductor wafer). The curing and thermal aging processes may be conducted at same or different locations, using same or different heating apparatuses.

The inventive silsesquioxane materials may be used in one or more fabricating steps in the manufacture of an electronic device of MEMS or in one or more operating conditions using the electronic device or MEMS. The aged polymeric silsesquioxane is useful as an antireflective coating (ARC) such as a bottom ARC (BARC) under a photoresist material, a temporary bonding adhesive (TBA) or permanent bonding adhesive (PBA), an encapsulant such as an optical encapsulant for LEDs, an interfacial layer such as a thermal insulator, or a pottant such as for electrical inverters and converters. The aged polymeric silsesquioxane may be prepared in place on an electronic or optical component.

A BARC method comprises applying a coating composition comprising the silsesquioxane resin prepolymer of formula (I) and a vehicle to a semiconductor wafer (e.g., via spin coating), removing the vehicle from the wafer without curing the prepolymer of formula (I) (e.g., by soft baking), curing the resulting soft baked silsesquioxane resin prepolymer of formula (I) (dried) on the wafer to give a coating of the cured polymeric silsesquioxane of formula (I), and thermally aging the cured polymeric silsesquioxane of formula (I) to give a BARC comprising the aged polymeric silsesquioxane disposed on the semiconductor wafer. Thereafter, a photoresist material may be, for example, applied on the BARC, patterned, etched, or developed.

A TBA method comprises applying a coating composition comprising the silsesquioxane resin prepolymer of formula (I) and a vehicle to a semiconductor wafer (e.g., via spin coating), removing the vehicle from the wafer without curing the prepolymer of formula (I) (e.g., by soft baking), placing a support substrate over the resulting soft baked silsesquioxane resin prepolymer of formula (I) (dried) on the wafer to give a laminate having the soft baked prepolymer of formula (I) disposed between the wafer and support substrate, curing the prepolymer of formula (I) in the laminate to give the cured polymeric silsesquioxane of formula (I) in the laminate, and thermally aging the cured polymeric silsesquioxane of formula (I) to give an aged laminate comprising the aged polymeric silsesquioxane disposed between the support substrate and the semiconductor wafer. The aged laminate can be processed (e.g., diced or an IC built thereon) to give a processed laminate, and then the support substrate can be separated from the semiconductor wafer of the processed laminate by soaking the processed laminate in the liquid fluoride stripper.

The encapsulant, interfacial layer, or pottant method can use the silsesquioxane resin prepolymer of formula (I) or cured polymeric silsesquioxane of formula (I) according to known encapsulating, layering, or potting methods, and the cured polymeric silsesquioxane of formula (I) can be thermally aged in place to give the aged polymeric silsesquioxane as an encapsulant, interfacial layer or pottant. Aging in place can be done on a photo(voltaic) cell or LED lamp (encapsulant), between two electronic components (interfacial layer), or inside a housing containing electrical components of an inverter or converter (pottant).

The aged polymeric silsesquioxane is particularly useful in manufacturing or operating conditions requiring a high temperature process, e.g., a fabricating step conducted at a temperature from 460° to 700° C. Examples of such high temperature processes are high temperature material depositions and high temperature treatment processes. Examples of the high temperature material depositions are chemical vapor deposition (CVD) using a CVD precursor or atomic layer deposition (ALD) using an ALD precursor, all carried out at a temperature above 450° C. For example, a CVD or ALD process of depositing on a substrate a semiconductor material, e.g., elemental silicon, silicon carbide, or silicon nitride. Examples of the high temperature treatment process are annealing, ashing, or etching, all carried out at a temperature above 450° C. For example, annealing a silicon nitride layer on a polysilicon wafer, ashing a sacrificial polymer for removal from a semiconductor device, or plasma treating or etching a surface of a semiconductor device for forming a dielectric layer on a semiconductor material. The plasma treating step may comprise oxygen plasma treating (oxygen plasma etching). The cured polymeric silsesquioxane of formula (I) is useful for making the aged polymeric silsesquioxane, which making may precede and be separate from the high temperature process or may be a beginning portion (in situ) during the high temperature process. The silsesquioxane resin prepolymer of formula (I) is useful for making the cured polymeric silsesquioxane of formula (I).

The subscripts x, y, and any z in formula (I) are selected to ultimately balance the concentration of R groups ($R^{Ar}$ plus any $R^{Alk}$) relative to H atoms in the aged polymeric silsesquioxane. We discovered that in cured polymeric silsesquioxane of formula (I), when subscript x is less than 0.20, and thus when the sum of subscripts y+z (if z>0) is greater than 0.80, the thermal stability of the resulting non-invention aged polymeric silsesquioxane undesirably decreases. Also, the strippability of the resulting non-invention aged polymeric silsesquioxane in our liquid fluoride stripper may undesirably decrease. The concentration of R groups ($R^{Ar}$ plus any $R^{Alk}$) relative to H atoms in the aged polymeric silsesquioxane beneficially enables oxygen plasma etching thereof, as desirable for manufacturing semiconductor devices discussed above.

In addition to uses in high temperature processes, the inventive silsesquioxane materials are useful in low temperature processes of making electronic devices and MEMS. For example, the inventive silsesquioxane materials may be used in any one or more of the following fabricating steps: depositing a photoresist material on the inventive silsesquioxane material (e.g., the aged polymeric silsesquioxane) to give a laminate comprising a layer of the photoresist material disposed on the inventive silsesquioxane material disposed on a semiconductor component; patterning the layer of the photoresist material of the laminate via lithography to give a first patterned laminate comprising a patterned layer of the photoresist material disposed on the inventive silsesquioxane material (e.g., the aged polymeric silsesquioxane) disposed on the semiconductor component; etching the first patterned laminate to give a second patterned laminate comprising a patterned layer of the photoresist material disposed on a patterned layer of the inventive silsesquioxane material (e.g., the aged polymeric silsesquioxane) disposed on the semiconductor component; depositing a semiconductor material in the second patterned laminate to give a filled pattern disposed on the semiconductor component; etching back or planarizing the filled pattern to give an etched or planarized filled pattern; and filling a pattern of the inventive silsesquioxane material (e.g., the aged polymeric silsesquioxane) with a semiconductor material, planarizing at least the inventive silsesquioxane material (e.g., the aged polymeric silsesquioxane), and stripping at least some of the inventive silsesquioxane material (e.g., the aged polymeric silsesquioxane). When the inventive silsesquioxane material is the aged polymeric silsesquioxane, the stripping may comprise using our liquid fluoride stripper.

Any article of manufacture or device containing the aged polymeric silsesquioxane is a contemplated embodiment of this invention. The article or device may be referred to herein as a thermally aged article or thermally aged device. The aged polymeric silsesquioxane of the thermally aged article or device may be the aged product, alternatively the mass-stable product, which are described earlier.

Any formulation comprising the aged polymeric silsesquioxane and at least one additional constituent that is not the aged polymeric silsesquioxane is also a contemplated embodiment of this invention. In some embodiments the formulation contains the aged polymeric silsesquioxane in a particulate form. In some embodiments the at least one additional constituent comprises the cured polymeric silsesquioxane of formula (I); the silsesquioxane resin prepolymer of formula (I); the liquid vehicle; the organosiloxane monomer or oligomer; the silane; the non-resinous polyorganosiloxane; the organic polymer; the particulate carbon; or the particulate inorganic solid. Examples of the liquid vehicle are silicone fluids having a kinematic viscosity at 25 C of from 50 to 500 centistokes and organic solvents such as toluene, PGMEA, methyl ethyl ketone, ethyl acetate, xylenes, and the like. Examples of the organosiloxane monomer or oligomer are tetraalkoxysilanes, hexaalkyldisiloxane, and octamethylcyclosiloxane. Examples of the silanes are tetramethylsilane, monosilane, hexachlorodisilane, and the like. Examples of the non-resinous polyorganosiloxane are polydimethylsiloxanes and poly(methyl, phenyl)(dimethyl)siloxanes. Examples of the organic polymer are polyesters, polyamides, polyimides, polyolefins, polycarbonates, and the like. Examples of the particulate inorganic solid are pigments (e.g., $TiO_2$), ceramics, silicas, silicates, and alkoxides of a metal of any one of Groups 1 to 13 of the Periodic Table of the Elements. Examples of the particulate carbon are active carbons, diamond, carbon nanotubes, graphene, and graphite. The aged polymeric silsesquioxane of the formulation may be the aged product, alternatively the mass-stable product, which are described earlier. Embodiments have been described earlier.

If desired, the silsesquioxane resin prepolymer of formula (I) may be synthesized from silane monomers such as $HSiCl_3$ and $ArylSiCl_3$, and, optionally $AlkSiCl_3$, under controlled hydrolysis conditions at relatively low temperatures, typically from 20° to 50° C.

The invention may have additional uses unrelated to high temperature applications.

The invention has technical and non-technical advantages. Advantageously, the silsesquioxane resin prepolymer of formula (I) may be synthesized from silane monomers such as $HSiCl_3$ and $ArylSiCl_3$ under controlled hydrolysis conditions at relatively low reaction temperatures such as from 20° to 50° C. The silsesquioxane resin prepolymer of formula (I) may be cured at a relatively low cure temperature such as from 150° to 250° C., alternatively from 180° to 200° C. The inventive aged polymeric silsesquioxane is mass stable when heated to a temperature above 460° C. (e.g., >450° C.). Any gain or loss of mass of the aged polymeric silsesquioxane is relative to the starting weight of the silsesquioxane resin prepolymer of formula (I). Alternatively, any gain or loss of mass of the aged polymeric silsesquioxane is relative to the starting weight of the cured polymeric silsesquioxane of formula (I) made by curing the silsesquioxane resin prepolymer of formula (I).

The invention is further illustrated by, and an invention embodiment may include any combinations of features and limitations of, the non-limiting examples thereof that follow. Ambient temperature is about 23° C. unless indicated otherwise.

EXAMPLES $^{29}$Si-NMR instrument and solvent: a Varian 400 MHz Mercury spectrometer was used. CDCl$_3$ was used as the solvent.

Liquid Fluoride Stripper 1: prepared by adding an additional amount of aqueous ammonium fluoride to ACT NE-14 (Air Products & Chemicals, Inc., Allentown, Pa., USA) to give Liquid Fluoride Stripper 1, which comprises acetic acid, dimethyl acetamide, ammonium fluoride, and water, wherein the concentration of the ammonium fluoride is from 4 to 15 wt % based on total weight of Liquid Fluoride Stripper 1.

Synthesizing the silsesquioxane resin prepolymer of formula (I): use toluene and the controlled hydrolysis method with trichlorosilane (HSiCl$_3$), phenyltrichlorosilane (PhSiCl$_3$), and optionally methyltrichlorosilane (CH$_3$SiCl$_3$) in toluene to give a first mixture of the silsesquioxane resin prepolymer of formula (I) in PGMEA containing 3.5% water. The synthesized silsesquioxane resin prepolymer of formula (I) will comprise (HSiO$_{3/2}$)$_x$(PhSiO$_{3/2}$)$_y$(MeSiO$_{3/2}$)$_z$, wherein Ph is phenyl, Me is methyl, and subscripts x, y and z are as defined above. The mole fractions of the units in formula (I) of (HSiO$_{3/2}$)$_x$, (PhSiO$_{3/2}$)$_y$, and (MeSiO$_{3/2}$)$_z$ will be equal to the relative molar amounts of the HSiCl$_3$, PhSiCl$_3$, and any CH$_3$SiCl$_3$ used in the controlled hydrolysis. The mole fractions of the units in formula (I) may thus be controlled by controlling the relative molar amounts of the HSiCl$_3$, PhSiCl$_3$, and any CH$_3$SiCl$_3$ used in the controlled hydrolysis.

Isolating or reformulating the synthesized silsesquioxane resin prepolymer of formula (I): If desired, evaporate the toluene and volatiles, such as any unreacted trichlorosilanes and volatile by-products, from the first mixture [described above in the method of synthesizing the silsesquioxane resin prepolymer of formula (I)] to give the silsesquioxane resin prepolymer of formula (I) as an isolated solid. Alternatively, if desired, solvent exchange out the PGMEA of the first mixture with another solvent such as methyl ethyl ketone (MEK) or methyl isobutyl ketone (MIBK) to give a second mixture of the silsesquioxane resin prepolymer of formula (I) in the other solvent. The second mixture may be configured to contain 10 wt % of the silsesquioxane resin prepolymer of formula (I) in PGMEA. Other concentrations of the silsesquioxane resin prepolymer of formula (I) in PGMEA may be used such as 5 wt % to 40 wt %, although 10 wt % is a convenient concentration to make and use. The second mixture may be filtered using a 0.2 μm filtration membrane to give a solution of the silsesquioxane resin prepolymer of formula (I) in PGMEA.

Preparation of Coated Semiconductor Wafers: spin-coat a solution of an example of the silsesquioxane resin prepolymer of formula (I) in PGMEA (10% solids) on a 6 inch (15 centimeter (cm) diameter silicon wafer with a Karl Suss CT62 spin coater instrument, and then (soft) bake on a hot plate at 150° C. for 1 minute to remove PGMEA to give a soft baked wafer comprising a film of the silsesquioxane resin prepolymer of formula (I) disposed on the silicon wafer. Measure the initial thickness of the film using an Ellipsometer. Place the soft baked wafer into a dual quartz furnace set at a predetermined cure temperature from 150° to 250° C., and heat it for 30 minutes, and cool to 23° C. to give a cured polymeric silsesquioxane of formula (I) disposed on the silicon wafer ("cured wafer"). Useful cure temperatures are 150° C., 180° C., 180° C., and 200° C. Record the initial thickness and cure temperature. Average initial film thickness may be from 0.200 to 0.500 μm, alternatively from 0.240 to 0.400 μm.

Thermally aging the cured polymeric silsesquioxane of formula (I): heat a dried form of either the silsesquioxane resin prepolymer of formula (I) or the cured polymeric silsesquioxane of formula (I) prepared above using any one of Thermal Programs A to H described below in Stability Test Method 1 or 2 to thermally age the cured polymeric silsesquioxane of formula (I) and give an embodiment of the aged polymeric silsesquioxane that is characterized as being a mass-stable product.

Stability Test Method 1: prepare a test sample by placing a 10% solution of an example of the silsesquioxane resin prepolymer of formula (I) in a solvent such as propylene glycol methyl ether acetate (PGMEA) in an aluminum pan, and evaporating the solvent at 120° C. for 30 minutes to give a dried test sample of the silsesquioxane resin prepolymer of formula (I). Place approximately 20 mg of the dried test sample into a 150 microliter (μL) alumina crucible, and subject the placed sample to thermogravimetric analysis (TGA) using a Mettler Toledo TGA instrument using a heating rate of 10° C. per minute (° C./min.) and a molecular nitrogen gas and/or air purge gas flowing at a rate of 40 milliliters per minute (mL/min.). The dried test sample is cured in situ and then thermally aged under dry molecular nitrogen gas atmosphere (unless otherwise noted), and analyzed through a thermal aging temperature profile using a thermal program inputted into the TGA instrument, as described below in the Examples. Suitable in situ curing and thermal aging temperature profiles may be obtained according to any one of the following thermal programs A to E. Thermal Program A: heating from 23° to 700° C. at 10° C./min., holding at 700° C. for 30 minutes, and then cooling to 23° C. Thermal Program B: heating from 23° to 600° C. at 10° C./min., and holding at 600° C. for 60 minutes, and cooling to 23° C. Thermal Program C: heating from 23° to 500° C. at 10° C./min., and holding at 500° C. for 60 minutes, and cooling to 23° C. Thermal Program D: heating from 23° to 350° C. at 10° C./min., holding at 350° C. for 20 minutes, then heating from 350° C. to 600° C. at 10° C./min., then holding at 600° C. for 60 minutes, and cooling the resulting thermally-aged article to 23° C. Thermal Program E: heating from 23° to 350° C. at 10° C./min., holding at 350° C. for 20 minutes, then heating from 350° C. to 500° C. at 10° C./min., then holding at 500° C. for 60 minutes, and cooling the resulting thermally-aged article to 23° C. Report the weight loss as a percent in tabular or thermographic format. Alternatively, the thermal programs A to E may be used for thermal aging an analysis of a pre-made sample of the cured polymeric silsesquioxane of formula (I).

Stability Test Method 2: apply a 10% solution of an example of the silsesquioxane resin prepolymer of formula (I) in a solvent such as PGMEA to a silicon wafer, dry the applied solution at 120° C. for 30 minutes to give a coated article comprising a dried test film of the silsesquioxane resin prepolymer of formula (I) disposed on the silicon wafer. The dried test film is cured in situ and then thermally aged under dry molecular nitrogen gas atmosphere (unless otherwise noted) by heating the coated article according to any one of the following Thermal Programs F to H, and then cooling the resulting thermally aged article to 23° C. Thermal Program F: heat at 500° C. for 30 minutes, and cool to 23° C. Thermal Program G: heat at 550° C. for 30 minutes, and cool to 23° C. Thermal Program H: heat at 600° C. for 30 minutes, and cool to 23° C. The heating in Thermal Programs F to H may be done in a dual quartz furnace set at the thermal program temperature. Alternatively, the thermal programs F to H may be used for thermal aging an analysis of a pre-made sample of the cured polymeric silsesquioxane of formula (I).

Stripping Test Method 1: Immerse the thermally aged article, which was prepared according to the Stability Test Method 1 or 2 described above, into a predetermined stripping solution for a predetermined period of time to give an immersed wafer. Remove the immersed from the stripping solution, and rinse it with deionized (DI) water to give a processed wafer. Measure the thickness of any remaining film on the processed wafer using an Ellipsometer (J. A. Woollam, M200D). Record the stripping solution, period of time of immersion, and thickness of any remaining film.

Inventive Example (IEx.) 1: synthesis of a $T(H)_{0.90}T(phenyl)_{0.10}$ silsesquioxane resin prepolymer of formula (I). A solution of 30.5 grams (g) (0.225 moles) of trichlorosilane and 5.29 g (0.025 moles) of phenyltrichlorosilane dissolved in 120 g of dry PGMEA was transferred to a 3-necked flask under nitrogen gas. The mole ratio of water to total number of silicon atoms from the trichlorosilane and the phenyltrichlorosilane was 2.2:1. To the transferred solution was added a premixed solution of 200 g PGMEA and 10 g (0.555 moles) water ("wet PGMEA") over one hour. The resulting reaction mixture was stirred at 20° C. for 1 hour after the addition of the wet PGMEA was completed in order to body (reach reaction equilibrium) the mixture. The resulting bodied mixture comprised the $T(H)_{0.90}T(phenyl)_{0.10}$ silsesquioxane resin prepolymer, which is of formula (I). The bodied mixture was concentrated by removing volatiles (e.g., hydrogen chloride and some of the PGMEA) on a rotary evaporator (bath temperature 40° C.) to give a first concentrate comprising 10 wt % solids content in PGMEA. Approximately 40 g of ethanol was added to the first concentrate, and the resulting first diluted mixture was stripped to give a second concentrate comprising 20 wt % solids content in PGMEA. The second concentrate was diluted with a predetermined amount of dry PGMEA to give a second diluted mixture comprising 10 wt % solids content in PGMEA. The second diluted mixture was filtered through a 0.20 μm poly(tetrafluoroethylene) (PTFE) filter, and the filtrate was stored in a 250 mL-volume high density polyethylene (HDPE) bottle to give a stored solution of the $T(H)_{0.90}T(phenyl)_{0.10}$ silsesquioxane resin prepolymer, which is of formula (I), in dry PGMEA.

IEx. 1(A): isolated and dried $T(H)_{0.90}T(phenyl)_{0.10}$ silsesquioxane resin prepolymer (prophetic): strip all PGMEA from an aliquot of the stored solution of IEx. 1 to give a residue comprising the $T(H)_{0.90}T(phenyl)_{0.10}$ silsesquioxane resin prepolymer, which is of formula (I), as an isolated and dried material.

IEx. 2: synthesis of a $T(H)_{0.85}T(phenyl)_{0.15}$ silsesquioxane resin prepolymer of formula (I). Replicate the procedure of IEx. 1 except use 28.8 g (0.2125 mol) of trichlorosilane instead of the 30.5 g (0.225 moles) of trichlorosilane and use 7.93 g (0.0375 mol) of phenyltrichlorosilane instead of the 5.29 g (0.025 moles) of phenyltrichlorosilane to give a stored solution of the $T(H)_{0.85}T(phenyl)_{0.15}$ silsesquioxane resin prepolymer, which is of formula (I), in PGMEA.

IEx. 2(A): isolated and dried $T(H)_{0.85}T(phenyl)_{0.15}$ silsesquioxane resin prepolymer (prophetic): strip all PGMEA from an aliquot of the stored solution of IEx. 2 to give a residue comprising the $T(H)_{0.85}T(phenyl)_{0.15}$ silsesquioxane resin prepolymer, which is of formula (I), as an isolated and dried material.

IEx. 3: synthesis of a $T(H)_{0.80}T(phenyl)_{0.20}$ silsesquioxane resin prepolymer of formula (I). Replicate the procedure of IEx. 1 except use 27.1 g (0.20 mol) of trichlorosilane instead of the 30.5 g (0.225 moles) of trichlorosilane and use 10.58 g (0.050 mol) of phenyltrichlorosilane instead of the 5.29 g (0.025 moles) of phenyltrichlorosilane to give a stored solution of the $T(H)_{0.80}T(phenyl)_{0.20}$ silsesquioxane resin prepolymer, which is of formula (I), in PGMEA.

IEx. 3(A): isolated and dried $T(H)_{0.80}T(phenyl)_{0.20}$ silsesquioxane resin prepolymer (prophetic): strip all PGMEA from an aliquot of the stored solution of IEx. 3 to give a residue comprising the $T(H)_{0.80}T(phenyl)_{0.20}$ silsesquioxane resin prepolymer, which is of formula (I), as an isolated and dried material.

IEx. 4: synthesis of a $T(H)_{0.50}T(phenyl)_{0.50}$ silsesquioxane resin prepolymer of formula (I). Replicate the procedure of IEx. 1 except use 16.9 g (0.125 mol) of trichlorosilane instead of the 30.5 g (0.225 moles) of trichlorosilane and use 26.44 g (0.125 mol) of phenyltrichlorosilane instead of the 5.29 g (0.025 moles) of phenyltrichlorosilane to give a stored solution of the $T(H)_{0.50}T(phenyl)_{0.50}$ silsesquioxane resin prepolymer, which is of formula (I), in PGMEA.

IEx. 4(A): isolated and dried $T(H)_{0.50}T(phenyl)_{0.50}$ silsesquioxane resin prepolymer (prophetic): strip all PGMEA from an aliquot of the stored solution of IEx. 4 to give a residue comprising the $T(H)_{0.50}T(phenyl)_{0.50}$ silsesquioxane resin prepolymer, which is of formula (I), as an isolated and dried material.

IEx. 5: synthesis of a $T(H)_{0.35}T(phenyl)_{0.25}T(methyl)_{0.40}$ silsesquioxane resin prepolymer of formula (I). Replicate the procedure of IEx. 1 except use 11.9 g (0.088 mol) of trichlorosilane instead of the 30.5 g (0.225 moles) of trichlorosilane, use 13.22 g (0.063 mol) of phenyltrichlorosilane instead of the 5.29 g (0.025 moles) of phenyltrichlorosilane, and add 15.0 g (0.100 mol) of methyltrichlorosilane in the solution that was transferred to the 3-necked flask, to give a stored solution of the $T(H)_{0.35}T(phenyl)_{0.25}T(methyl)_{0.40}$ silsesquioxane resin prepolymer, which is of formula (I), in PGMEA.

IEx. 5(A): isolated and dried $T(H)_{0.35}T(phenyl)_{0.25}T(methyl)_{0.40}$ silsesquioxane resin prepolymer (prophetic): strip all PGMEA from an aliquot of the stored solution of IEx. 5 to give a residue comprising the $T(H)_{0.35}T(phenyl)_{0.25}T(methyl)_{0.40}$ silsesquioxane resin prepolymer, which is of formula (I), as an isolated and dried material.

IEx. 6: synthesis of a $T(H)_{0.30}T(phenyl)_{0.25}T(methyl)_{0.45}$ silsesquioxane resin prepolymer of formula (I). Replicate the procedure of IEx. 1 except use 10.2 g (0.075 mol) of trichlorosilane instead of the 30.5 g (0.225 moles) of trichlorosilane, use 13.22 g (0.063 mol) of phenyltrichlorosilane instead of the 5.29 g (0.025 moles) of phenyltrichlorosilane, and add 16.82 g (0.113 mol) of methyltrichlorosilane in the solution that was transferred to the 3-necked flask, to give a stored solution of the $T(H)_{0.30}T(phenyl)_{0.25}T(methyl)_{0.45}$ silsesquioxane resin prepolymer, which is of formula (I), in PGMEA.

IEx. 6(A): isolated and dried $T(H)_{0.30}T(Phenyl)_{0.25}T(methyl)_{0.45}$ silsesquioxane resin prepolymer (prophetic): strip all PGMEA from an aliquot of the stored solution of IEx. 6 to give a residue comprising the $T(H)_{0.30}T(phenyl)_{0.25}T(methyl)_{0.45}$ silsesquioxane resin prepolymer, which is of formula (I), as an isolated and dried material.

IEx. 7: synthesis of a $T(H)_{0.25}T(phenyl)_{0.10}T(methyl)_{0.65}$ silsesquioxane resin prepolymer of formula (I). Replicate the procedure of IEx. 1 except use 8.47 g (0.063 mol) of trichlorosilane instead of the 30.5 g (0.225 moles) of trichlorosilane and add 24.3 g (0.163 mol) of methyltrichlorosilane in the solution that was transferred to the 3-necked flask, to give a stored solution of the $T(H)_{0.25}T(phenyl)_{0.10}T(methyl)_{0.65}$ silsesquioxane resin prepolymer, which is of formula (I), in PGMEA.

IEx. 7(A): isolated and dried $T(H)_{0.25}T(phenyl)_{0.10}T(methyl)_{0.65}$ silsesquioxane resin prepolymer (prophetic): strip all PGMEA from an aliquot of the stored solution of IEx. 7 to give a residue comprising the $T(H)_{0.25}T(phenyl)_{0.10}T(methyl)_{0.65}$ silsesquioxane resin prepolymer, which is of formula (I), as an isolated and dried material.

IEx. 8: synthesis of a $T(H)_{0.40}T(phenyl)_{0.10}T(methyl)_{0.50}$ silsesquioxane resin prepolymer of formula (I). Replicate the procedure of IEx. 1 except use 13.6 g (0.100 mol) of trichlorosilane instead of the 30.5 g (0.225 moles) of trichlorosilane and add 18.69 g (0.125 mol) of methyltrichlorosilane in the solution that was transferred to the 3-necked flask, to give a stored solution of the $T(H)_{0.40}T(phenyl)_{0.10}T(methyl)_{0.50}$ silsesquioxane resin prepolymer, which is of formula (I), in PGMEA.

IEx. 8(A): isolated and dried $T(H)_{0.40}T(phenyl)_{0.10}T(methyl)_{0.50}$ silsesquioxane resin prepolymer (prophetic): strip all PGMEA from an aliquot of the stored solution of IEx. 8 to give a residue comprising the $T(H)_{0.40}T(phenyl)_{0.10}T(methyl)_{0.50}$ silsesquioxane resin prepolymer, which is of formula (I), as an isolated and dried material.

IEx. 9: synthesis of a $T(H)_{0.85}T(phenyl)_{0.15}$ silsesquioxane resin prepolymer of formula (I). Replicated the procedure of IEx. 2 to give a stored solution of the $T(H)_{0.85}T(phenyl)_{0.15}$ silsesquioxane resin prepolymer, which is of formula (I), in PGMEA.

IEx. 9(A): isolated and dried $T(H)_{0.85}T(phenyl)_{0.15}$ silsesquioxane resin prepolymer of formula (I): stripped all PGMEA from an aliquot of the stored solution of IEx. 9 to give a residue comprising the $T(H)_{0.85}T(phenyl)_{0.15}$ silsesquioxane resin prepolymer, which is of formula (I), as an isolated and dried material.

IEx. A to V: preparation of aged polymeric silsesquioxanes: separately soft bake (150° C. for 60 seconds) the silsesquioxane resin prepolymers of formula (I) of any one of IEx. 1 to IEx. 9, and then cure and thermally age the soft baked silsesquioxane resin prepolymers of formula (I) of any one of IEx. 1 to IEx. 9 according to any one of Thermal Programs A to H to sequentially give cured polymeric silsesquioxanes of formula (I) followed by the aged polymeric silsesquioxanes as mass-stable products of IEx. A to V, respectively, as shown below in Table 1.

TABLE 1 aged polymeric silsesquioxanes of IEx. A to V.

| Aged Polymeric Silsesquioxane Ex. No. | Silsesquioxane resin prepolymer Ex. No. | Thermal Program | Maximum Thermal Aging Temperature | Weight loss (gain) (%) |
|---|---|---|---|---|
| IEx. A | IEx. 2 | A | 700° C. | 1.99 |
| IEx. B | IEx. 4 | A | 700° C. | 10.5 |
| IEx. C | IEx. 5 | A | 700° C. | 3.91 |
| IEx. D | IEx. 6 | A | 700° C. | 3.57 |
| IEx. E | IEx. 7 | A | 700° C. | 2.83 |
| IEx. F | IEx. 8 | A | 700° C. | 3.53 |
| IEx. G | IEx. 2 | B | 600° C. | 2.2 |
| IEx. H | IEx. 2 | D | 600° C. | 2.0 |
| IEx. I | IEx. 3 | B | 600° C. | 6.1 |
| IEx. J | IEx. 3 | D | 600° C. | 5.1 |
| IEx. K | IEx. 1 | B | 600° C. | 4.6 |
| IEx. L | IEx. 1 | D | 600° C. | 4.4 |
| IEx. M | IEx. 2 | C | 500° C. | 1.5 |
| IEx. N | IEx. 2 | E | 500° C. | 1.8 |
| IEx. O | IEx. 9 | C | 500° C. | 0.3 |
| IEx. P | IEx. 9 | E | 500° C. | (1.0)* |
| IEx. Q** | IEx. 2 | C | 500° C. | 0 ≤ 2.1 |
| IEx. R** | IEx. 3 | C | 500° C. | 0 ≤ 6.0 |
| IEx. S** | IEx. 1 | C | 500° C. | 0 ≤ 4.5 |
| IEx. T** | IEx. 2 | F | 500° C. | 0 ≤ 1.8 |
| IEx. U** | IEx. 2 | G | 550° C. | 0 ≤ 1.9 |
| IEx. V** | IEx. 2 | H | 600° C. | 0 ≤ 2.0 |

*i.e., a weight gain of 1.0%;
**indicates prophetic example.

As shown by the data in Table 1, the inventive aged polymeric silsesquioxane is stable after being prepared by heating a corresponding cured polymeric silsesquioxane of formula (I) at 500°, 550°, 600°, or 700° C. or for up to 60 minutes to give embodiments of the aged polymeric silsesquioxane (as mass-stable products). The gain or loss of mass of the aged polymeric silsesquioxane is relative to the starting mass of the silsesquioxane resin prepolymer of formula (I) and is calculated by subtracting the weight of the aged polymeric silsesquioxane from the starting weight of the dried form of the silsesquioxane resin prepolymer of formula (I). The weight of the dried form of the silsesquioxane resin prepolymer of formula (I) is equal to the weight of the cured polymeric silsesquioxane of formula (I) prepared therefrom by curing. In some embodiments the gain or loss of mass of the aged polymeric silsesquioxane is relative to the starting mass of the cured polymeric silsesquioxane of formula (I). Curing of the silsesquioxane resin prepolymer of formula (I), and then thermal aging of the resulting cured polymeric silsesquioxane of formula (I) may give the aged polymeric silsesquioxane as a mass-stable product that has lost (may lose) from >0% to less than 15% mass, alternatively from >0% to less than 11% mass, alternatively from >0% to <7% mass. In some embodiments the aged polymeric silsesquioxane has lost (may lose) from >0% to <6% mass, alternatively from >0% to <5% mass, alternatively from >0% to <4% mass, alternatively from >0% to <3% mass, alternatively from >0% to 2% mass, relative to the starting mass of the dried form of the silsesquioxane resin prepolymer of formula (I). In some embodiments the aged polymeric silsesquioxane has lost (may lose) at least 1.9% mass, alternatively at least 2.0% mass. This low extent of mass loss makes the aged polymeric silsesquioxane, e.g., the mass-stable product form embodiment thereof) suitable for use in high temperature manufacturing methods that are emerging in the aerospace and semiconductor device fabrication industries.

IEx. W to Z and AA to AP: preparation of soft baked and cured wafers: prepare soft baked and cured wafers according to the Preparation of Coated Wafers described earlier. Subject the cured wafers of IEx. V to IEx. Z and AA to AP to the Stability Test Method 1 or 2 followed by the Stripping Test Method 1 to assess strippability of the aged polymeric silsesquioxane of the cured wafers. Record the results below in Table 2.

In Table 2, TMAH is 2.4 wt % tetramethylammonium hydroxide solution in water, a non-fluoride based stripper.

TABLE 2 soft baked wafers, heat aged coated wafers and strippability thereof.

| Aged polymeric silsesquioxane* Ex. No. | Silsesquioxane resin prepolymer Ex. No. | Maximum Thermal Aging Temp. | Stripping Solution | Stripping Conditions | Completely Removed Coating? |
|---|---|---|---|---|---|
| IEx. W | IEx. 2 | 450° C. | 2.4 wt % TMAH$_{aq}$ | 45° C./4 min. | Yes |
| IEx. X | IEx. 2 | 500° C. | 2.4 wt % TMAH$_{aq}$ | 45° C./4 min | No |
| IEx. Y | IEx. 2 | 600° C. | 2.4 wt % TMAH$_{aq}$ | 45° C./4 min | No |
| IEx. Z | IEx. 2 | 450° C. | Liq. F 1** | 23° C./10 min | Yes |
| IEx. AA | IEx. 2 | 500° C. | Liq. F 1 | 23° C./10 min | Yes |
| IEx. AB | IEx. 2 | 600° C. | Liq. F 1 | 23° C./10 min | Yes |
| IEx. AC | IEx. 3 | 500° C. | Liq. F 1 | 60° C./10 min | Yes |
| IEx. AD | IEx. 3 | 550° C. | Liq. F 1 | 60° C./10 min | Yes |
| IEx. AE | IEx. 3 | 600° C. | Liq. F 1 | 60° C./10 min | Yes |
| IEx. AF | IEx. 1 | 500° C. | Liq. F 1 | 60° C./10 min | Yes |
| IEx. AG | IEx. 1 | 550° C. | Liq. F 1 | 60° C./10 min | Yes |
| IEx. AH | IEx. 1 | 600° C. | Liq. F 1 | 60° C./10 min | Yes |
| IEx. AI | IEx. 1 | 500° C. | ACT NE-14 | 60° C./20 min | Yes |
| IEx. AJ | IEx. 1 | 600° C. | ACT NE-14 | 60° C./10 min | No |
| IEx. AK | IEx. 3 | 500° C. | 2.4 wt % TMAH$_{aq}$ | 50° C./10 min | No |
| IEx. AL | IEx. 3 | 550° C. | 2.4 wt % TMAH$_{aq}$ | 50° C./10 min | No |
| IEx. AM | IEx. 3 | 600° C. | 2.4 wt % TMAH$_{aq}$ | 50° C./10 min | No |
| IEx. AN | IEx. 1 | 500° C. | 2.4 wt % TMAH$_{aq}$ | 50° C./10 min | No |
| IEx. AO | IEx. 1 | 550° C. | 2.4 wt % TMAH$_{aq}$ | 50° C./10 min | No |
| IEx. AP | IEx. 1 | 600° C. | 2.4 wt % TMAH$_{aq}$ | 50° C./10 min | No |

*mass-stable product;
**Liq. F = Liquid Fluoride Stripper 1

As shown by the data in Table 2, a thermally aged coating of the aged polymeric silsesquioxane can be completely stripped from the substrate using our liquid fluoride-based stripper such as a liquid fluoride-based stripper comprising acetic acid, dimethyl acetamide, ammonium fluoride, and water, wherein the concentration of the ammonium fluoride is from at least 4 wt % to 15 wt % based on total weight of the liquid fluoride stripper. This strippability with liquid fluoride stripper is unpredictable, especially when the thermally aged coating is TMAH$_{aq}$-resistant. Thus, the aged polymeric silsesquioxane is suitable as a sacrificial polymer for semiconductor device manufacturing processes that require stripping, as well as a reworkable polymer for manufacturing processes for making electronic devices wherein the aged polymeric silsesquioxane can be allowed to remain in the electronic device.

The below claims are incorporated by reference here, and the terms "claim" and "claims" are replaced by the term "aspect" or "aspects," respectively. Embodiments of the invention also include these resulting numbered aspects.

What is claimed is:

1. An aged polymeric silsesquioxane that is a product made by a process comprising heating step (a) or (b), wherein heating step (a) is comprised of substeps (a)(1) and (a)(2):

(a)(1) heating a silsesquioxane resin prepolymer at a temperature of from 150 degrees Celsius (° C.) to 300° C. for a time of at least 10 seconds to give a cured polymeric silsesquioxane, and then (a)(2) heating the cured polymeric silsesquioxane at a temperature of from 500° to 700° C. for at least 30 minutes to give the aged polymeric silsesquioxane, wherein the silsesquioxane resin prepolymer is of formula (I): $(HSiO_{(3-h)/2}(OH)_h)_x(R^{Ar}SiO_{(3-h)/2}(OH)_h)_y(R^{Alk}SiO_{(3-h)/2}(OH)_h)_z$ wherein each $R^{Ar}$ independently is phenyl or naphthyl, each $R^{Alk}$ independently is $(C_1$-$C_3)$alkyl, subscript x is a mole fraction from 0.20 to 0.94, subscript y is a mole fraction from 0.06 to 0.80, subscript z is a mole fraction from 0 to 0.70, the sum x+y+z=1, and each h independently is 0, 1 or 2, wherein in the silsesquioxane resin prepolymer of formula (I) the mole percent, $w^1$, of units having SiOH groups is from 6 to 38 mole percent; or (b) heating a cured polymeric silsesquioxane at a temperature of from 500° to 700° C. for at least 30 minutes to give the aged polymeric silsesquioxane;

wherein in the heating step (a) or (b) the cured polymeric silsesquioxane independently is of formula (I): $(HSiO_{(3-h)/2}(OH)_h)_x(R^{Ar}SiO_{(3-h)/2}(OH)_h)_y(R^{Alk}SiO_{(3-h)/2}(OH)_h)_z$ (I), wherein each $R^{Ar}$ independently is phenyl or naphthyl, each $R^{Alk}$ independently is $(C_1$-$C_3)$alkyl, subscript x is a mole fraction from 0.20 to 0.94, subscript y is a mole fraction from 0.06 to 0.80, subscript z is a mole fraction from 0 to 0.70, the sum x+y+z=1, and each h independently is 0, 1 or 2, wherein in the cured polymeric silsesquioxane of formula (I) the mole percent, $w^2$, of units having SiOH groups is from 1 to 20 mole percent; and wherein $w^1 > w^2$; and wherein the silsesquioxane resin prepolymer of formula (I) is characterized by a first mass, mass1, and the aged polymeric silsesquioxane is characterized by a second mass, mass2, wherein mass2=from 0.85 mass1 to 1.02 mass1.

2. The aged polymeric silsesquioxane of claim 1 wherein the process comprises the heating step (a).

3. The aged polymeric silsesquioxane of claim 1 wherein the process comprises the heating step (b).

4. The aged polymeric silsesquioxane of claim 1 characterizable by any one of the following limitations (A) to (C):
 (A) wherein the cured polymeric silsesquioxane of formula (I) and the aged polymeric silsesquioxane differ from each other by at least one chemical characteristic selected from: solubility by immersion in 2.4 weight percent aqueous tetramethylammonium hydroxide ($TMAH_{aq}$) at 60° C. for 10 minutes, wherein the solubility of the aged polymeric silsesquioxane is at least 25% less than the solubility of the cured polymeric silsesquioxane of formula (I) therein; or speed of dissolution in 2.4 weight percent aqueous tetramethylammonium hydroxide ($TMAH_{aq}$) at 60° C.;
 (B) wherein the cured polymeric silsesquioxane of formula (I) and the aged polymeric silsesquioxane differ from each other by content of silicon-bonded hydrogen atoms, that is "Si—H content", as measured by Fourier-Transform Infrared (FT-IR) Spectroscopy, wherein the Si—H content of the aged polymeric silsesquioxane is at least 25% less than the Si—H content of the cured polymeric silsesquioxane of formula (I);
 (C) wherein the silsesquioxane resin prepolymer of formula (I) and the cured polymeric silsesquioxane of formula (I) differ from each other by solubility in propylene glycol monomethyl ether monoacetate, PGMEA, at 25° C., wherein the silsesquioxane resin prepolymer of formula (I) is completely soluble and the cured polymeric silsesquioxane of formula (I) is insoluble or at least partially insoluble, all measured with 0.10 g of the silsesquioxane resin prepolymer of formula (I) or cured polymeric silsesquioxane of formula (I), respectively, in 1.0 milliliter of PGMEA at 25° C.

5. The aged polymeric silsesquioxane of claim 1 made by a process comprising the heating step (a) wherein after performing the heating substep (a)(1) the process further comprises a substep (a)(1.5) cooling the cured polymeric silsesquioxane of formula (I) to a temperature of from 0° C. to 40° C. prior to performing the heating substep (a)(2).

6. An article of manufacture comprising the aged polymeric silsesquioxane of claim 1 configured as a sheet; a plurality of particulates; or a designed pattern.

7. The article of manufacture of claim 6 further comprising a substrate, which is disposed in operative contact with the aged polymeric silsesquioxane.

8. An electronic device comprising the aged polymeric silsesquioxane of claim 1 and an electronic component disposed in operative contact therewith.

9. A method of making a high-temperature-formed feature of a semiconductor device, the method comprising subjecting an article comprising the aged polymeric silsesquioxane of claim 1 disposed on a semiconductor component to at least one fabricating step carried out at a temperature of from 460° to 700° C. to give a semiconductor device comprising a high-temperature-formed feature and the aged polymeric silsesquioxane disposed on the semiconductor component.

10. The method of claim 9 further comprising any one of the following limitations (1) to (7):

(1) wherein the high temperature-formed feature is made by a material deposition or treatment process carried out at a temperature of from 460° to 700° C.;
 (2) wherein the high temperature-formed feature is made by a material deposition or treatment process carried out at a temperature of from 460° to 700° C., wherein the material deposition process comprises chemical vapor deposition using a CVD precursor or atomic layer deposition using an ALD precursor; and wherein the treatment process comprises annealing, ashing, or etching; all carried out at a temperature of from 460° to 700° C.;
 (3) wherein the aged polymeric silsesquioxane is pre-made via step (a) or (b) before the fabricating step is performed or the aged polymeric silsesquioxane is made via step (a) or (b) in situ when the fabricating step is performed;
 (4) wherein the method further comprises, before the fabricating step is performed, spin-coating a mixture of the silsesquioxane resin prepolymer of formula (I) and a delivery vehicle on the semiconductor component to give a wet coating, and removing the delivery vehicle from the wet coating to give a dried coating of the silsesquioxane resin prepolymer of formula (I) in contact with the semiconductor component;
 (5) wherein the semiconductor component comprises a semiconductor wafer; and
 (6) wherein the high temperature-formed feature comprises a deposit of a semiconductor material, an annealed semiconductor material, an ashing residue, or an etched layer; and
 (7) wherein the semiconductor device comprises a photo (voltaic)cell, a diode, a transistor, or an integrated circuit.

11. The method of claim 9 further comprising wet stripping at least some of the aged polymeric silsesquioxane from the semiconductor component with a liquid fluoride stripper, wherein the liquid fluoride stripper comprises acetic acid, dimethyl acetamide, ammonium fluoride, and water, wherein the concentration of the ammonium fluoride is from at least 4 weight percent (wt %) to 15 wt % based on total weight of the liquid fluoride stripper, the wet stripping comprising contacting the aged polymeric silsesquioxane with the liquid fluoride stripper so as to dissolve at least some of the aged polymeric silsesquioxane in the liquid fluoride stripper.

12. A formulation comprising a dispersion of particulates of the aged polymeric silsesquioxane of claim 1 and at least one additional constituent that is not the aged polymeric silsesquioxane.

13. The formulation of claim 12 wherein the at least one additional constituent is the cured polymeric silsesquioxane of formula (I); the silsesquioxane resin prepolymer of formula (I); a liquid vehicle; an organosiloxane monomer or oligomer; a silane; a non-resinous polyorganosiloxane; an organic polymer; a particulate carbon; and a particulate inorganic solid.

14. A method of removing an aged polymeric silsesquioxane of claim 1 from a substrate in contact therewith, using a liquid fluoride stripper, wherein the liquid fluoride stripper comprises acetic acid, dimethyl acetamide, ammonium fluoride, and water, wherein the concentration of the ammonium fluoride is from at least 4 weight percent (wt %) to 15 wt % based on total weight of the liquid fluoride stripper, the method comprising contacting the aged polymeric silsesquioxane with a liquid fluoride stripper so as to dissolve at least some of the aged polymeric silsesquioxane in the liquid fluoride stripper.

15. The aged polymeric silsesquioxane of claim 1 comprising any one of the following limitations (aa) to (ll):
(aa) the cured polymeric silsesquioxane of formula (I) comprises a cured product of curing a substantially solvent free form of the silsesquioxane resin prepolymer of formula (I) having less than 0.5 wt % solvent having a boiling point of from 30° to 150° C.;
(bb) each $R^{Ar}$ is phenyl and each $R^{Alk}$ is methyl;
(cc) both (aa) and (bb);
(dd) subscript x is a mole fraction from 0.25 to 0.90, subscript y is a mole fraction from 0.10 to 0.50, subscript z is a mole fraction from 0 to 0.65, and the sum x+y+z=1;
(ee) subscript z is 0 and the aged polymeric silsesquioxane is of formula (I-a): $(HSiO_{3/2})_x(PhenylSiO)_{3/2y}$ (I-a), wherein subscript x is from 0.5 to 0.94 and subscript y is from 0.06 to 0.5 and the sum x=y=1;
(ff) both (bb) and (ee);
(gg) each of (aa), (bb) and (ee);
(hh) subscript z is a mole fraction from 0.40 to 0.65 and the aged polymeric silsesquioxane is of formula (I-b): $(HSiO_{3/2})_x(PhenylSiO_{3/2})_y(CH_3SiO_{3/2})_z$ (I-b), wherein subscript x is from 0.25 to 0.40, subscript y is from 0.10 to 0.25, subscript z is the mole fraction from 0.40 to 0.65, and the sum x+y+z=1;
(ii) both (bb) and (hh);
(jj) each of (aa), (bb) and (hh);
(kk) each $R^{Ar}$ is phenyl and each $R^{Alk}$ is methyl; and the mole fractions of the resulting $(HSiO_{3/2})_x$ unit (T(H)), the $(phenylSiO)_{3/2y}$ unit (T(phenyl)), and the (methylSiO)$_{3/2y}$ unit (T(methyl)) in the silsesquioxane resin prepolymer of formula (I), the cured polymeric silsesquioxane of formula (I), or the aged polymeric silsesquioxane are selected from:
$T(H)_{0.90}T(phenyl)_{0.10}$;
$T(H)_{0.85}T(phenyl)_{0.15}$;
$T(H)_{0.80}T(phenyl)_{0.20}$;
$T(H)_{0.50}T(phenyl)_{0.50}$;
$T(H)_{0.35}T(phenyl)_{0.25}T(methyl)_{0.40}$;
$T(H)_{0.30}T(phenyl)_{0.25}T(methyl)_{0.45}$;
$T(H)_{0.25}T(phenyl)_{0.10}T(methyl)_{0.65}$; and
$T(H)_{0.40}T(phenyl)_{0.10}T(methyl)_{0.50}$;
(ll) limitation (kk) and either (aa) or (cc).

* * * * *